US012588043B2

(12) United States Patent
Taherzadeh Boroujeni et al.

(10) Patent No.: US 12,588,043 B2
(45) Date of Patent: Mar. 24, 2026

(54) ENABLING REMAINING MINIMUM SYSTEM INFORMATION (RMSI) REPETITION OR RMSI SLOT AGGREGATION

(71) Applicant: QUALCOMM Incorporated, San Diego, CA (US)

(72) Inventors: Mahmoud Taherzadeh Boroujeni, San Diego, CA (US); Tao Luo, San Diego, CA (US); Iyab Issam Sakhnini, San Diego, CA (US); Jelena Damnjanovic, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/595,010

(22) Filed: Mar. 4, 2024

(65) Prior Publication Data

US 2024/0205954 A1 Jun. 20, 2024

Related U.S. Application Data

(63) Continuation of application No. 17/223,573, filed on Apr. 6, 2021, now Pat. No. 11,991,730.
(Continued)

(51) Int. Cl.
*H04W 72/53* (2023.01)
*H04W 24/08* (2009.01)
(Continued)

(52) U.S. Cl.
CPC ........... *H04W 72/53* (2023.01); *H04W 24/08* (2013.01); *H04W 72/0446* (2013.01);
(Continued)

(58) Field of Classification Search
None
See application file for complete search history.

(56) References Cited

U.S. PATENT DOCUMENTS 10,912,012 B2 * 2/2021 Chakraborty ......... H04W 24/08
11,469,962 B2 * 10/2022 Liu ..................... H04L 41/0806
(Continued)

FOREIGN PATENT DOCUMENTS

CN 112514509 A * 3/2021 ............ H04W 16/14

OTHER PUBLICATIONS

International Preliminary Report on Patentability—PCT/US2021/026208—The International Bureau of WIPO—Geneva, Switzerland—Oct. 20, 2022.
(Continued)

*Primary Examiner* — Christopher T Wyllie
(74) *Attorney, Agent, or Firm* — Norton Rose Fulbright US LLP

(57) ABSTRACT

This disclosure provides systems, methods, and apparatuses, including computer programs encoded on computer storage media, for wireless communication. In one aspect, a method of wireless communication performed by a user equipment (UE) includes receiving, from a base station, a remaining minimum system information (RMSI) physical downlink control channel (PDCCH) that includes downlink control information (DCI). The DCI indicates a configuration of resources associated with RMSI repetition or RMSI slot aggregation. The method further includes monitoring for one or more RMSI messages based on the configuration of resources. The monitoring includes monitoring for multiple repetitions of an RMSI message based on the configuration of resources being associated with RMSI repetition and monitoring for a single RMSI message that is divided across multiple slots based on the configuration of resources being
(Continued)

*410* associated with RMSI slot aggregation. Other aspects are also claimed and described.

30 Claims, 7 Drawing Sheets

Related U.S. Application Data

(60) Provisional application No. 63/008,030, filed on Apr. 10, 2020.

(51) Int. Cl.
| | |
|---|---|
| *H04W 72/0446* | (2023.01) |
| *H04W 72/0453* | (2023.01) |
| *H04W 72/23* | (2023.01) |
| *H04W 72/30* | (2023.01) |

(52) U.S. Cl.
CPC ....... *H04W 72/0453* (2013.01); *H04W 72/23* (2023.01); *H04W 72/30* (2023.01)

(56) References Cited

U.S. PATENT DOCUMENTS

| | | | | |
|---|---|---|---|---|
| 2018/0167946 | A1* | 6/2018 | Si | H04L 5/00 |
| 2018/0323922 | A1* | 11/2018 | Lindoff | H04L 5/0048 |
| 2019/0053196 | A1* | 2/2019 | Abedini | H04W 48/12 |
| 2019/0140776 | A1* | 5/2019 | Seo | H04L 1/0071 |
| 2019/0261295 | A1* | 8/2019 | Peisa | H04W 48/12 |
| 2020/0045737 | A1 | 2/2020 | Ly et al. | |
| 2020/0146104 | A1* | 5/2020 | Wong | H04W 88/02 |
| 2020/0296656 | A1* | 9/2020 | Amuru | H04L 1/1607 |
| 2020/0314795 | A1* | 10/2020 | Wakabayashi | H04W 64/00 |
| 2020/0344671 | A1* | 10/2020 | He | H04W 48/08 |
| 2020/0351807 | A1* | 11/2020 | Wong | H04W 52/0235 |
| 2020/0366560 | A1* | 11/2020 | Liu | H04L 5/0053 |
| 2020/0367166 | A1* | 11/2020 | Wong | H04W 52/0229 |
| 2021/0120585 | A1* | 4/2021 | Yang | H04W 76/27 |
| 2021/0168737 | A1* | 6/2021 | Tang | H04L 5/0053 |
| 2021/0321374 | A1* | 10/2021 | Taherzadeh Boroujeni | H04L 5/0048 |
| 2021/0321408 | A1* | 10/2021 | Taherzadeh Boroujeni | H04W 72/0446 |
| 2021/0352700 | A1* | 11/2021 | Lohr | H04W 72/21 |
| 2021/0400526 | A1* | 12/2021 | Wu | H04W 72/21 |
| 2021/0410104 | A1* | 12/2021 | Taherzadeh Boroujeni | H04W 72/30 |
| 2022/0322450 | A1* | 10/2022 | Taherzadeh Boroujeni | H04W 74/0833 |
| 2023/0217304 | A1* | 7/2023 | Singh | H04W 72/21 370/329 |
| 2024/0205954 | A1* | 6/2024 | Taherzadeh Boroujeni | H04L 5/0094 |

OTHER PUBLICATIONS

International Search Report and Written Opinion—PCT/US2021/026208—ISA/EPO—Jun. 29, 2021.

\* cited by examiner

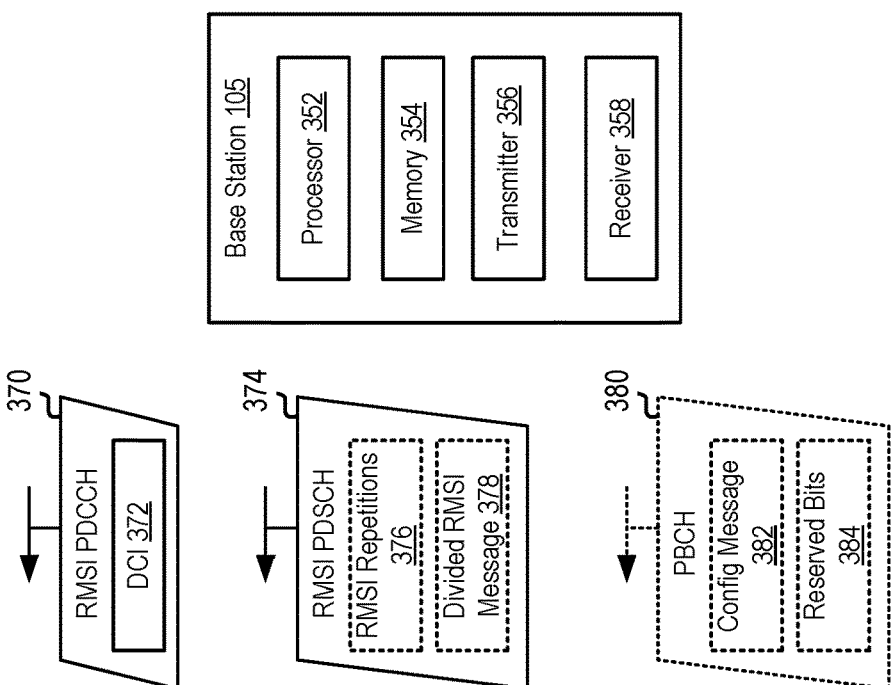
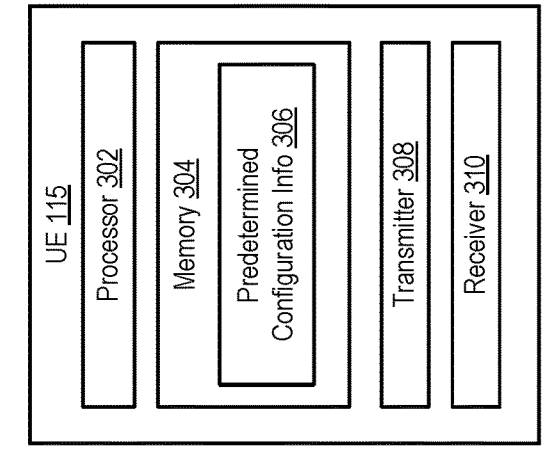
*FIGURE 3*

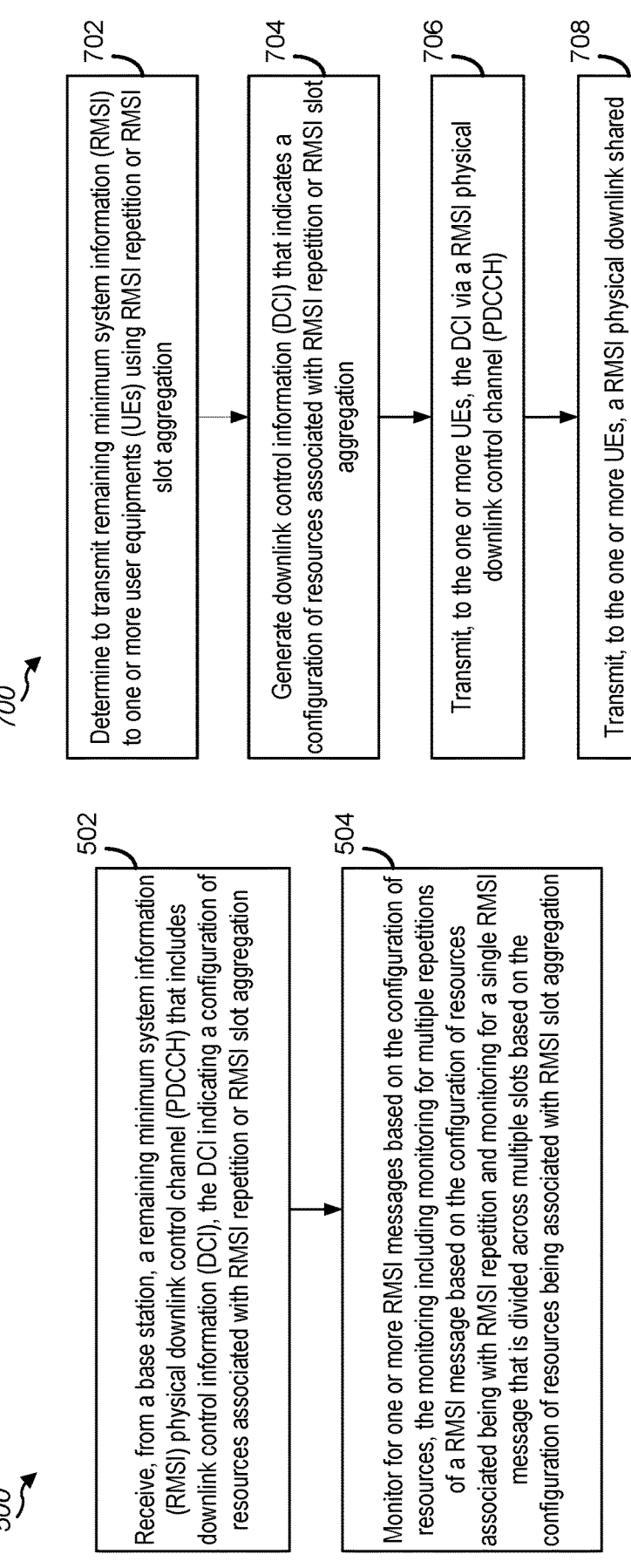

700

702
Determine to transmit remaining minimum system information (RMSI) to one or more user equipments (UEs) using RMSI repetition or RMSI slot aggregation 704
Generate downlink control information (DCI) that indicates a configuration of resources associated with RMSI repetition or RMSI slot aggregation 706
Transmit, to the one or more UEs, the DCI via a RMSI physical downlink control channel (PDCCH)

708
Transmit, to the one or more UEs, a RMSI physical downlink shared channel (PDSCH) that includes multiple repetitions of a RMSI message based on determining to transmit the RMSI using RMSI repetition and a single RMSI message that is divided across multiple slots based on determining to transmit the RMSI using RMSI slot aggregation

502
Receive, from a base station, a remaining minimum system information (RMSI) physical downlink control channel (PDCCH) that includes downlink control information (DCI), the DCI indicating a configuration of resources associated with RMSI repetition or RMSI slot aggregation 504
Monitor for one or more RMSI messages based on the configuration of resources, the monitoring including monitoring for multiple repetitions of a RMSI message based on the configuration of resources associated being with RMSI repetition and monitoring for a single RMSI message that is divided across multiple slots based on the configuration of resources being associated with RMSI slot aggregation

FIGURE 5

ENABLING REMAINING MINIMUM SYSTEM INFORMATION (RMSI) REPETITION OR RMSI SLOT AGGREGATION

CROSS-REFERENCE TO RELATED APPLICATIONS

This application is a continuation and claims the benefit of U.S. patent application Ser. No. 17/223,573, entitled, "ENABLING REMAINING MINIMUM SYSTEM INFORMATION (RMSI) REPETITION OR RMSI SLOT AGGREGATION," filed Apr. 6, 2021, and also claims the benefit of U.S. Provisional Patent Application No. 63/008,030, entitled, "ENABLING REMAINING MINIMUM SYSTEM INFORMATION (RMSI) REPETITION OR RMSI SLOT AGGREGATION," filed on Apr. 10, 2020, both are expressly incorporated by reference herein in their entirety.

TECHNICAL FIELD

Aspects of the present disclosure relate generally to wireless communication systems, and more particularly, to enabling remaining minimum system information (RMSI) repetition or RMSI slot aggregation in wireless communication systems.

DESCRIPTION OF THE RELATED TECHNOLOGY

Wireless communications systems are widely deployed to provide various types of communication content such as voice, video, packet data, messaging, broadcast, and so on. A wireless multiple-access communications system may include a number of base stations or network access nodes, each simultaneously supporting communication for multiple communication devices, which may be otherwise known as user equipment (UE). These systems may be capable of supporting communication with multiple UEs by sharing the available system resources (such as time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

One technique used by at least some 5G wireless communication systems is the communication of control information and data via millimeter-wave transmissions. Millimeter-wave typically refers to the band in the communication spectrum between 30 gigahertz (GHz) and 300 GHz. Millimeter-wave communications enable 5G wireless communication systems to have expanded capacity, as compared to 4G wireless communication systems. In 5G communication systems, control information and data are communicated between base stations and UEs via a variety of channels. Channels may refer to time resources, such as time blocks, frequency resources, such as frequency bands or subbands, or both, that are used by the base stations and UEs to perform wireless communications. As an example, control information is typically communicated from a base station to a UE via a physical downlink control channel (PDCCH), and data is typically communicated from a base station to a UE via a physical downlink shared channel (PDSCH). Additional channels may be used for uplink communications from the UE to the base station. Another type of channel used for communication between the UE and the base station is a random access channel (RACH). UEs typically transmit messages to the base station via the RACH to gain access to the network, such as to schedule calls or for bursty data transmissions.

To enable access to the network, the base station may transmit, to a UE, a master information block (MIB) that includes a first portion of information used to access the network. The remaining portions of the information may be included in one or more remaining minimum system information (RMSI) messages that are transmitted from the base station to the UE. RMSI messages in 5G communication systems may be similar to system information blocks (SIBs) SIB1 and SIB2 in LTE communication systems.

As research into millimeter-wave communications continues in 5G wireless communication systems, a source of potential bottleneck for coverage of the millimeter-wave communications is RMSI messages. One reason for the limited coverage of the RMSI messages is that network entities, such as base stations, use wide broadcast beams to transmit the RMSI messages and corresponding scheduling information. These broadcast beams may not provide sufficient gain for communication of the RMSI messages and the scheduling information to at least some UEs at the edge of a coverage area.

SUMMARY

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

One innovative aspect of the subject matter described in this disclosure can be implemented in a method of wireless communication performed by a user equipment (UE). The method includes receiving, from a base station, a remaining minimum system information (RMSI) physical downlink control channel (PDCCH) that includes downlink control information (DCI). The DCI indicates a configuration of resources associated with RMSI repetition or RMSI slot aggregation. The method further includes monitoring for one or more RMSI messages based on the configuration of resources. The monitoring includes monitoring for multiple repetitions of an RMSI message based on the configuration of resources being associated with RMSI repetition and monitoring for a single RMSI message that is divided across multiple slots based on the configuration of resources being associated with RMSI slot aggregation.

Another innovative aspect of the subject matter described in this disclosure can be implemented in a UE. The UE includes at least one processor and a memory coupled with the at least one processor and storing processor-readable instructions that, when executed by the at least one processor, is configured to receive, from a base station, an RMSI PDCCH that includes DCI. The DCI indicates a configuration of resources associated with RMSI repetition or RMSI slot aggregation. The at least one processor is further configured to monitor for one or more RMSI messages based on the configuration of resources. The monitoring includes monitoring for multiple repetitions of an RMSI message based on the configuration of resources being associated with RMSI repetition and monitoring for a single RMSI message that is divided across multiple slots based on the configuration of resources being associated with RMSI slot aggregation.

Another innovative aspect of the subject matter described in this disclosure can be implemented in an apparatus configured for wireless communication. The apparatus includes means for receiving, from a base station, an RMSI PDCCH that includes DCI. The DCI indicates a configuration of resources associated with RMSI repetition or RMSI slot aggregation. The apparatus further includes means for monitoring for one or more RMSI messages based on the configuration of resources. The monitoring includes monitoring for multiple repetitions of an RMSI message based on the configuration of resources being associated with RMSI repetition and monitoring for a single RMSI message that is divided across multiple slots based on the configuration of resources being associated with RMSI slot aggregation.

Another innovative aspect of the subject matter described in this disclosure can be implemented in a non-transitory computer-readable medium storing instructions that, when executed by a processor, cause the processor to perform operations including receiving, from a base station, an RMSI PDCCH that includes DCI. The DCI indicates a configuration of resources associated with RMSI repetition or RMSI slot aggregation. The operations further include monitoring for one or more RMSI messages based on the configuration of resources. The monitoring includes monitoring for multiple repetitions of an RMSI message based on the configuration of resources being associated with RMSI repetition and monitoring for a single RMSI message that is divided across multiple slots based on the configuration of resources being associated with RMSI slot aggregation.

Another innovative aspect of the subject matter described in this disclosure can be implemented in a method of wireless communication performed by a base station. The method includes determining to transmit RMSI to one or more UEs using RMSI repetition or RMSI slot aggregation. The method includes generating DCI that indicates a configuration of resources associated with RMSI repetition or RMSI slot aggregation. The method also includes transmitting, to the one or more UEs, the DCI via an RMSI PDCCH. The method further includes transmitting, to the one or more UEs, an RMSI physical downlink shared channel (PDSCH) that includes multiple repetitions of an RMSI message based on determining to transmit the RMSI using RMSI repetition and a single RMSI message that is divided across multiple slots based on determining to transmit the RMSI using RMSI slot aggregation.

Another innovative aspect of the subject matter described in this disclosure can be implemented in a base station. The base station includes at least one processor and a memory coupled with the at least one processor and storing processor-readable code that, when executed by the processor, is configured to determine to transmit RMSI to one or more UEs using RMSI repetition or RMSI slot aggregation. The at least one processor is configured to generate DCI that indicates a configuration of resources associated with RMSI repetition or RMSI slot aggregation. The at least one processor is also configured to initiate transmission, to the one or more UEs, of the DCI via an RMSI PDCCH. The at least one processor is further configured to initiate transmission, to the one or more UEs, of an RMSI PDSCH that includes multiple repetitions of an RMSI message based on determining to transmit the RMSI using RMSI repetition and a single RMSI message that is divided across multiple slots based on determining to transmit the RMSI using RMSI slot aggregation.

Another innovative aspect of the subject matter described in this disclosure can be implemented in an apparatus configured for wireless communication. The apparatus includes means for determining to transmit RMSI to one or more UEs using RMSI repetition or RMSI slot aggregation. The apparatus includes means for generating DCI that indicates a configuration of resources associated with RMSI repetition or RMSI slot aggregation. The apparatus also includes means for transmitting, to the one or more UEs, the DCI via an RMSI PDCCH. The apparatus further includes means for transmitting, to the one or more UEs, an RMSI PDSCH that includes multiple repetitions of an RMSI message based on determining to transmit the RMSI using RMSI repetition and a single RMSI message that is divided across multiple slots based on determining to transmit the RMSI using RMSI slot aggregation.

Another innovative aspect of the subject matter described in this disclosure can be implemented in a non-transitory computer-readable medium storing instructions that, when executed by a processor, cause the processor to perform operations including determining to transmit RMSI to one or more UEs using RMSI repetition or RMSI slot aggregation. The operations include generating DCI that indicates a configuration of resources associated with RMSI repetition or RMSI slot aggregation. The operations also include initiating transmission, to the one or more UEs, of the DCI via an RMSI PDCCH. The operations further include initiating transmission, to the one or more UEs, of an RMSI PDSCH that includes multiple repetitions of an RMSI message based on determining to transmit the RMSI using RMSI repetition and a single RMSI message that is divided across multiple slots based on determining to transmit the RMSI using RMSI slot aggregation.

Another innovative aspect of the subject matter described in this disclosure can be implemented in a method of wireless communication performed by a base station. The method includes transmitting, to one or more UEs, an RMSI PDCCH that includes DCI indicating a configuration of resources associated with RMSI repetition or RMSI slot aggregation. The method further includes transmitting, to the one or more UEs, an RMSI PDSCH over the resources using RMSI repetition or RMSI slot aggregation according to the configuration of resources. The transmitting includes transmitting multiple repetitions of an RMSI message based on using RMSI repetition and transmitting a single RMSI message that is divided across multiple slots based on using RMSI slot aggregation.

Another innovative aspect of the subject matter described in this disclosure can be implemented in a base station. The base station includes at least one processor and a memory coupled with the at least one processor and storing processor-readable code that, when executed by the processor, is configured to initiate transmission, to one or more UEs, of an RMSI PDCCH that includes DCI indicating a configuration of resources associated with RMSI repetition or RMSI slot aggregation. The at least one processor is further configured to initiate transmission, to the one or more UEs, of an RMSI PDSCH over the resources using RMSI repetition or RMSI slot aggregation according to the configuration of resources. The transmission includes transmission of multiple repetitions of an RMSI message based on using RMSI repetition and transmission of a single RMSI message that is divided across multiple slots based on using RMSI slot aggregation.

Another innovative aspect of the subject matter described in this disclosure can be implemented in an apparatus configured for wireless communication. The apparatus includes means for transmitting, to one or more UEs, an RMSI PDCCH that includes DCI indicating a configuration of resources associated with RMSI repetition or RMSI slot aggregation. The apparatus also includes means for transmitting, to the one or more UEs, an RMSI PDSCH over the resources using RMSI repetition or RMSI slot aggregation according to the configuration of resources. The transmitting includes transmitting multiple repetitions of an RMSI message based on using RMSI repetition and transmitting a single RMSI message that is divided across multiple slots based on using RMSI slot aggregation.

Another innovative aspect of the subject matter described in this disclosure can be implemented in a non-transitory computer-readable medium storing instructions that, when executed by a processor, cause the processor to perform operations including initiating transmission, to one or more UEs, of an RMSI PDCCH that includes DCI indicating a configuration of resources associated with RMSI repetition or RMSI slot aggregation. The operations further include initiating transmission, to the one or more UEs, of an RMSI PDSCH over the resources using RMSI repetition or RMSI slot aggregation according to the configuration of resources. The transmission includes transmission of repetitions of an RMSI message based on using RMSI repetition and transmission of a single RMSI message that is divided across multiple slots based on using RMSI slot aggregation.

Other aspects, features, and implementations of the present disclosure will become apparent to a person having ordinary skill in the art, upon reviewing the following description of specific, example implementations of the present disclosure in conjunction with the accompanying figures. While features of the present disclosure may be described relative to particular implementations and figures below, all implementations of the present disclosure can include one or more of the advantageous features described herein. In other words, while one or more implementations may be described as having particular advantageous features, one or more of such features may also be used in accordance with the various implementations of the disclosure described herein. In similar fashion, while example implementations may be described below as device, system, or method implementations, such example implementations can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 3 is a block diagram illustrating an example wireless communication system that supports remaining minimum system information (RMSI) repetition or RMSI slot aggregation according to one or more aspects.

FIG. 5 is a flow diagram illustrating an example process that supports RMSI repetition or RMSI slot aggregation according to one or more aspects.

FIG. 7 is a flow diagram illustrating an example process that supports RMSI repetition or RMSI slot aggregation according to one or more aspects.

Like reference numbers and designations in the various drawings indicate like elements.

DETAILED DESCRIPTION

Figure 1:
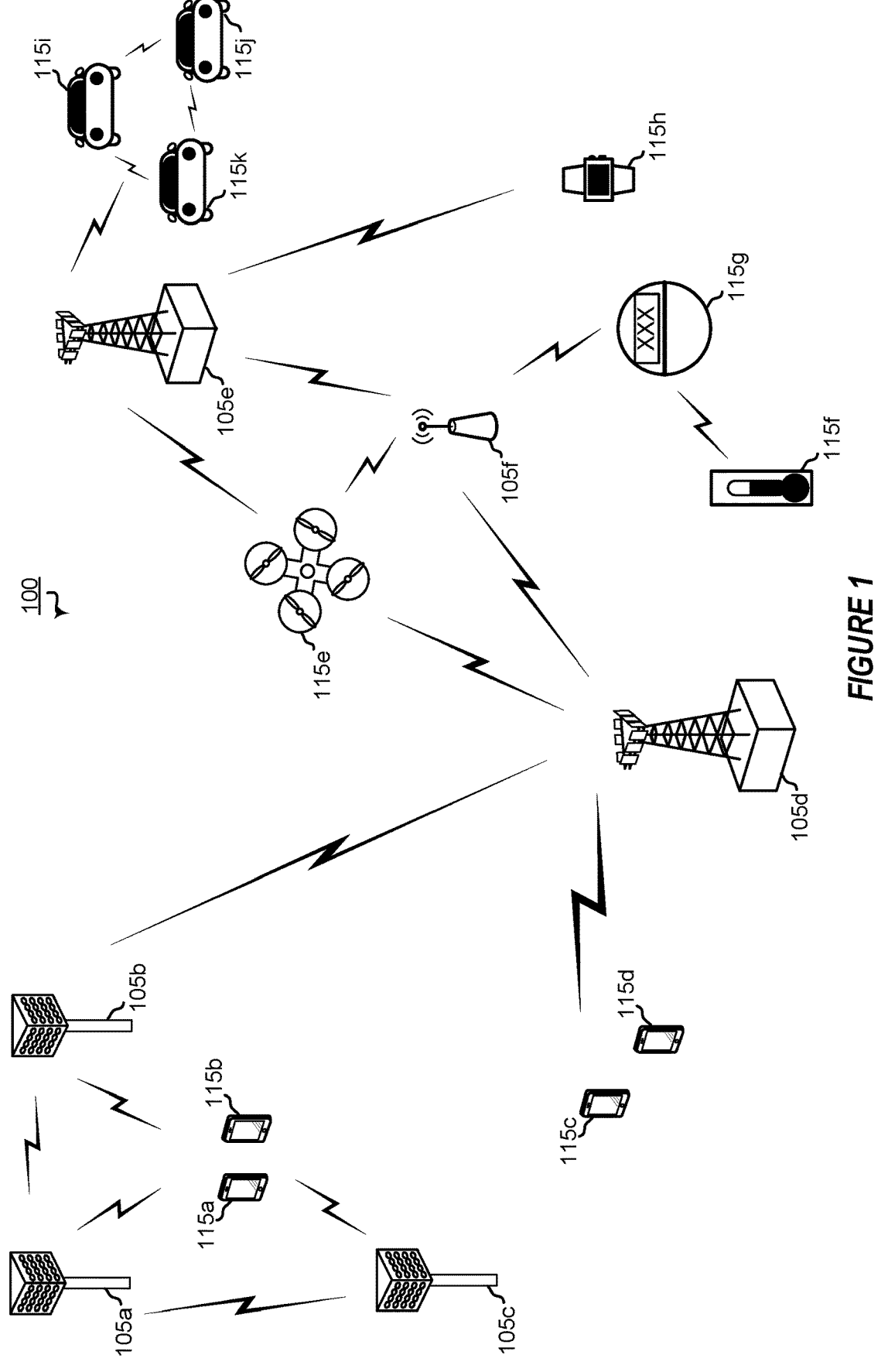
FIG. 1 is a block diagram illustrating details of an example wireless communication system according to one or more aspects.

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

The electromagnetic spectrum is often subdivided, based on frequency (or wavelength), into various classes, bands or channels. In fifth generation (5G) new radio (NR), two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band (or spectrum) in documents and articles, despite being different than the extremely high frequency (EHF) band (30 GHz-300 GHz) which is identified by the International Telecommunications Union (ITU) as a "millimeter wave" band. With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

The present disclosure provides systems, apparatus, methods, and computer-readable media for enabling remaining minimum system information (RMSI) repetition or RMSI slot aggregation. As used herein, performing RMSI repetition includes transmitting multiple repetitions of an RMSI message (that is, an RMSI message and one or more copies of the RMSI message) via an RMSI physical downlink shared channel (PDSCH). As used herein, performing RMSI slot aggregation includes dividing a single RMSI message into multiple portions and transmitting each of the multiple portions during a respective slot of a frame via an RMSI PDSCH. To illustrate, a base station may determine to transmit RMSI to one or more user equipments (UEs) using RMSI repetition or RMSI slot aggregation, and the base station may generate downlink control information (DCI) that indicates a configuration of resources, such as time resources, frequency resources, or both time and frequency resources, that are associated with the RMSI repetition or RMSI slot aggregation. The base station may transmit the DCI via an RMSI physical downlink control channel (PDCCH) to the one or more UEs. The base station also transmits, to the one or more UEs, an RMSI PDSCH based on the configuration. For example, if RMSI repetition is configured for a given transmission, the RMSI PDSCH includes multiple repetitions of an RMSI message. Alternatively, if RMSI slot aggregation is configured for a given transmission, the RMSI PDSCH includes a single RMSI message that is divided across multiple slots of a frame.

In some implementations, the base station transmits, to the one or more UEs, a configuration message via a physical broadcasts channel (PBCH). The configuration message includes one or more fields that indicate a mapping between a value of one or more fields of the DCI and resources, parameters, or both resources and parameters, associated with RMSI repetition or RMSI slot aggregation. In some implementations, each of the UEs interpret the one or more fields of the configuration message based on predetermined control resource set (CORESET) information stored at the UEs, as further described herein.

Particular implementations of the subject matter described in this disclosure can be implemented to realize one or more of the following potential advantages. In some aspects, the present disclosure provides techniques for enabling RMSI repetition or RMSI slot aggregation. Performing RMSI repetition or RMSI slot aggregation within a wireless communication system increases the number of communicated messages that include at least portions of the RMSI. Increasing the number of communicated messages that include the RMSI may increase reliability and coverage of the RMSI such that a likelihood that UEs at an edge of a coverage area will successfully receive the RMSI message (or portions thereof) is increased, as compared to transmitting only a single RMSI message and only during a single slot.

This disclosure relates generally to providing or participating in authorized shared access between two or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, 5th Generation (5G) or new radio (NR) networks (sometimes referred to as "5G NR" networks, systems, or devices), as well as other communications networks. As described herein, the terms "networks" and "systems" may be used interchangeably.

A CDMA network may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may implement a radio technology such as Global System for Mobile Communications (GSM). 3GPP defines standards for the GSM EDGE (enhanced data rates for GSM evolution) radio access network (RAN), also denoted as GERAN. GERAN is the radio component of GSM or GSM EDGE, together with the network that joins the base stations (for example, the Ater and Abis interfaces, among other examples) and the base station controllers (for example, A interfaces, among other examples). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may include one or more GERANs, which may be coupled with UTRANs in the case of a UMTS or GSM network. Additionally, an operator network may include one or more LTE networks, or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named the "3rd Generation Partnership Project" (3GPP), and cdma2000 is described in documents from an organization named "3rd Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP long term evolution (LTE) is a 3GPP project aimed at improving the universal mobile telecommunications system (UMTS) mobile phone standard. The 3GPP may define specifications for the next generation of mobile networks, mobile systems, and mobile devices. The present disclosure may describe certain aspects with reference to LTE, 4G, 5G, or NR technologies; however, the description is not intended to be limited to a specific technology or application, and one or more aspects described with reference to one technology may be understood to be applicable to another technology. Indeed, one or more aspects the present disclosure are related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (such as ~1M nodes per km²), ultra-low complexity (such as ~10 s of bits per sec), ultra-low energy (such as ~10+ years of battery life), and deep coverage with the capability to reach challenging locations; (2) including mission-critical control with strong security to safeguard sensitive personal, financial, or classified information, ultra-high reliability (such as ~99.9999% reliability), ultra-low latency (such as ~1 millisecond (ms)), and users with wide ranges of mobility or lack thereof; and (3) with enhanced mobile broadband including extreme high capacity (such as ~10 Tbps per km2), extreme data rates (such as multi-Gbps rate, 100+ Mbps user experienced rates), and deep awareness with advanced discovery and optimizations.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD) or frequency division duplex (FDD) design; and advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD or TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80 or 100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink or downlink scheduling information, data, and acknowledgement in the same subframe. The self-contained integrated subframe supports communications in unlicensed or contention-based shared spectrum, adaptive uplink or downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus and methods described herein may be applied to other communications systems and applications than the particular examples provided.

FIG. 1 is a block diagram illustrating details of an example wireless communication system according to one or more aspects. The wireless communication system may include wireless network 100. The wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements, such as device-to-device, peer-to-peer or ad hoc network arrangements, among other examples.

The wireless network 100 illustrated in FIG. 1 includes a number of base stations 105 and other network entities. A base station may be a station that communicates with the UEs and may be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station or a base station subsystem serving the coverage area, depending on the context in which the term is used. In implementations of the wireless network 100 herein, the base stations 105 may be associated with a same operator or different operators, such as the wireless network 100 may include a plurality of operator wireless networks. Additionally, in implementations of the wireless network 100 herein, the base stations 105 may provide wireless communications using one or more of the same frequencies, such as one or more frequency bands in licensed spectrum, unlicensed spectrum, or a combination thereof, as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, or other types of cell. A macro cell generally covers a relatively large geographic area, such as several kilometers in radius, and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area, such as a home, and, in addition to unrestricted access, may provide restricted access by UEs having an association with the femto cell, such as UEs in a closed subscriber group (CSG), UEs for users in the home, and the like. A base station for a macro cell may be referred to as a macro base station. A base station for a small cell may be referred to as a small cell base station, a pico base station, a femto base station or a home base station. In the example shown in FIG. 1, base stations 105d and 105e are regular macro base stations, while base stations 105a-105c are macro base stations enabled with one of 3 dimension (3D), full dimension (FD), or massive MIMO. Base stations 105a-105c take advantage of their higher dimension MIMO capabilities to exploit 3D beamforming in both elevation and azimuth beamforming to increase coverage and capacity. Base station 105f is a small cell base station which may be a home node or portable access point. A base station may support one or multiple cells, such as two cells, three cells, four cells, and the like.

The wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

The UEs 115 are dispersed throughout the wireless network 100, and each UE may be stationary or mobile. It should be appreciated that, although a mobile apparatus is commonly referred to as user equipment (UE) in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. Within the present document, a "mobile" apparatus or UE need not necessarily have a capability to move, and may be stationary. Some non-limiting examples of a mobile apparatus, such as may include implementations of one or more of the UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an "Internet of things" (IoT) or "Internet of everything" (IoE) device such as an automotive or other transportation vehicle, a satellite radio, a global positioning system (GPS) device, a global navigation satellite system (GNSS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, a gesture tracking device, a medical device, a digital audio player (such as MP3 player), a camera or a game console, among other examples; and digital home or smart home devices such as a home audio, video, and multimedia device, an appliance, a sensor, a vending machine, intelligent lighting, a home security system, or a smart meter, among other examples. In one aspect, a UE may be a device that includes a Universal Integrated Circuit Card (UICC). In another aspect, a UE may be a device that does not include a UICC. In some aspects, UEs that do not include UICCs may be referred to as IoE devices. The UEs 115a-115d of the implementation illustrated in FIG. 1 are examples of mobile smart phone-type devices accessing the wireless network 100. A UE may be a machine specifically configured for connected communication, including machine type communication (MTC), enhanced MTC (eMTC), narrowband IoT (NB-IoT) and the like. The UEs 115e-115k illustrated in FIG. 1 are examples of various machines configured for communication that access 5G network 100.

A mobile apparatus, such as the UEs 115, may be able to communicate with any type of the base stations, whether macro base stations, pico base stations, femto base stations, relays, and the like. In FIG. 1, a communication link (represented as a lightning bolt) indicates wireless transmissions between a UE and a serving base station, which is a base station designated to serve the UE on the downlink or uplink, or desired transmission between base stations, and backhaul transmissions between base stations. Backhaul communication between base stations of the wireless network 100 may occur using wired or wireless communication links.

In operation at the 5G network 100, the base stations 105a-105c serve the UEs 115a and 115b using 3D beamforming and coordinated spatial techniques, such as coordinated multipoint (CoMP) or multi-connectivity. Macro base station 105d performs backhaul communications with the base stations 105a-105c, as well as small cell, the base station 105f. Macro base station 105d also transmits multicast services which are subscribed to and received by the UEs 115c and 115d. Such multicast services may include mobile television or stream video, or may include other services for providing community information, such as weather emergencies or alerts, such as Amber alerts or gray alerts.

The wireless network 100 of implementations supports mission critical communications with ultra-reliable and redundant links for mission critical devices, such the UE 115e, which is a drone. Redundant communication links with the UE 115e include from the macro base stations 105d and 105e, as well as small cell base station 105f. Other machine type devices, such as UE 115f (thermometer), the UE 115g (smart meter), and the UE 115h (wearable device) may communicate through the wireless network 100 either directly with base stations, such as the small cell base station 105f, and the macro base station 105e, or in multi-hop configurations by communicating with another user device which relays its information to the network, such as the UE 115f communicating temperature measurement information to the smart meter, the UE 115g, which is then reported to the network through the small cell base station 105f. The 5G network 100 may provide additional network efficiency through dynamic, low-latency TDD or FDD communications, such as in a vehicle-to-vehicle (V2V) mesh network between the UEs 115i-115k communicating with the macro base station 105e.

Figure 2:
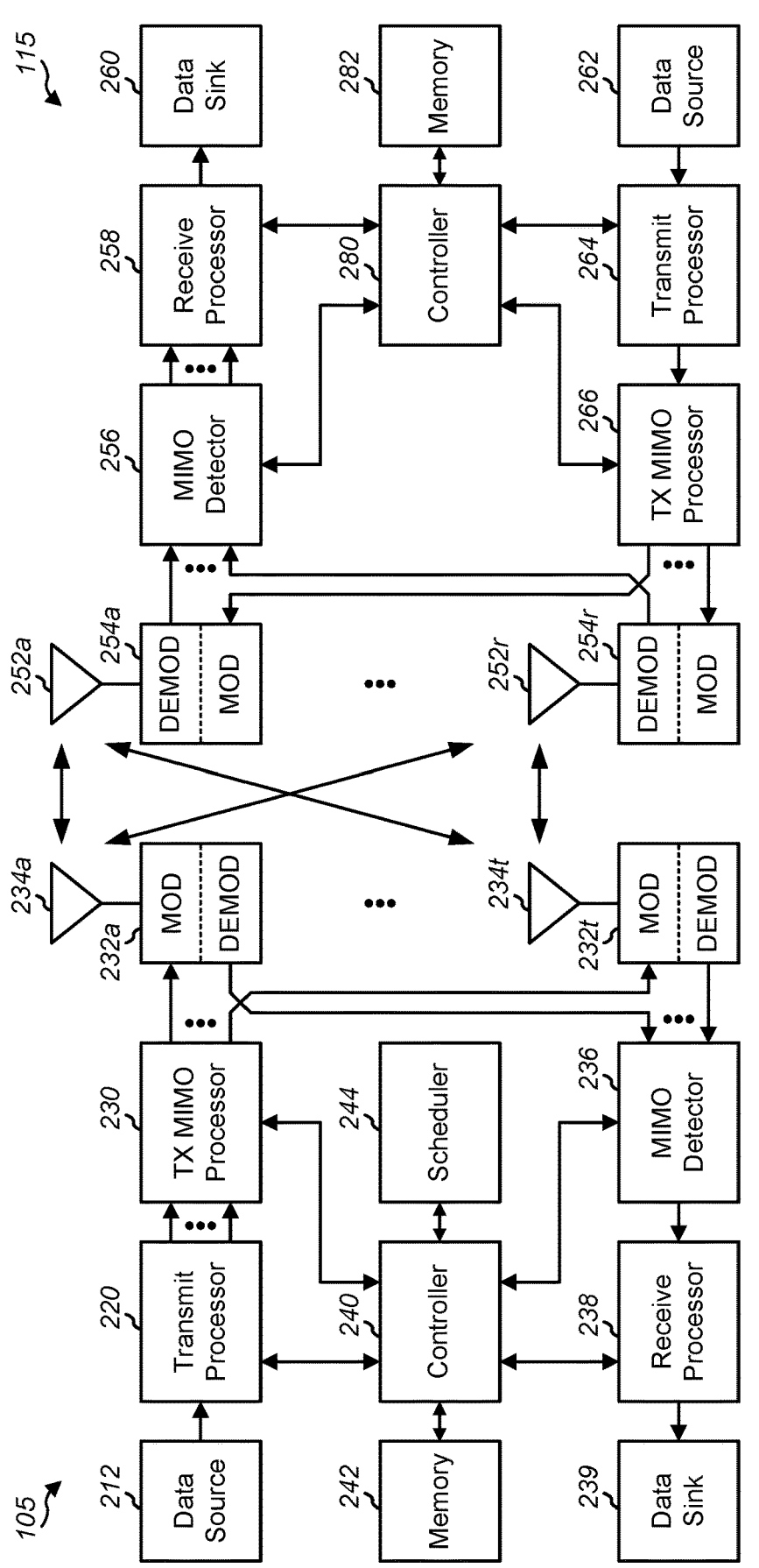
FIG. 2 is a block diagram illustrating examples of a base station and a user equipment (UE) according to one or more aspects.

FIG. 2 is a block diagram illustrating examples of a base station 105 and a UE 115 according to one or more aspects. The base station 105 and the UE 115 may be one of the base stations and one of the UEs in FIG. 1. For a restricted association scenario (as mentioned above), the base station 105 may be the small cell base station 105f in FIG. 1, and the UE 115 may be the UE 115c or 115d operating in a service area of the base station 105f, which in order to access the small cell base station 105f, would be included in a list of accessible UEs for the small cell base station 105f. Additionally, the base station 105 may be a base station of some other type. As shown in FIG. 2, the base station 105 may be equipped with antennas 234a through 234t, and the UE 115 may be equipped with antennas 252a through 252r for facilitating wireless communications.

At the base station 105, a transmit processor 220 may receive data from a data source 212 and control information from a controller 240. The control information may be for the physical broadcast channel (PBCH), physical control format indicator channel (PCFICH), physical hybrid-ARQ (automatic repeat request) indicator channel (PHICH), physical downlink control channel (PDCCH), enhanced physical downlink control channel (EPDCCH), or MTC physical downlink control channel (MPDCCH), among other examples. The data may be for the PDSCH, among other examples. The transmit processor 220 may process, such as encode and symbol map, the data and control information to obtain data symbols and control symbols, respectively. Additionally, the transmit processor 220 may generate reference symbols, such as for the primary synchronization signal (PSS) and secondary synchronization signal (SSS), and cell-specific reference signal. Transmit (TX) multiple-input multiple-output (MIMO) processor 230 may perform spatial processing on the data symbols, the control symbols, or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream, such as for OFDM, among other examples, to obtain an output sample stream. Each modulator 232 may additionally or alternatively process the output sample stream to obtain a downlink signal. For example, to process the output sample stream, each modulator 232 may convert to analog, amplify, filter, and upconvert the output sample stream to obtain the downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DE-MODs) 254a through 254r, respectively. Each demodulator 254 may condition a respective received signal to obtain input samples. For example, to condition the respective received signal, each demodulator 254 may filter, amplify, downconvert, and digitize the respective received signal to obtain the input samples. Each demodulator 254 may further process the input samples, such as for OFDM, among other examples, to obtain received symbols. MIMO detector 256 may obtain received symbols from demodulators 254a through 254r, perform MIMO detection on the received symbols if applicable, and provide detected symbols. Receive processor 258 may process the detected symbols, provide decoded data for the UE 115 to a data sink 260, and provide decoded control information to a controller 280. For example, to process the detected symbols, the receive processor 258 may demodulate, deinterleave, and decode the detected symbols.

On the uplink, at the UE 115, a transmit processor 264 may receive and process data (such as for the physical uplink shared channel (PUSCH)) from a data source 262 and control information (such as for the physical uplink control channel (PUCCH)) from the controller 280. Additionally, the transmit processor 264 may generate reference symbols for a reference signal. The symbols from the transmit processor 264 may be precoded by TX MIMO processor 266 if applicable, further processed by the modulators 254a through 254r (such as for SC-FDM, among other examples), and transmitted to the base station 105. At base station 105, the uplink signals from the UE 115 may be received by antennas 234, processed by demodulators 232, detected by MIMO detector 236 if applicable, and further processed by receive processor 238 to obtain decoded data and control information sent by the UE 115. The receive processor 238 may provide the decoded data to data sink 239 and the decoded control information to the controller 240.

The controllers 240 and 280 may direct the operation at the base station 105 and the UE 115, respectively. The controller 240 or other processors and modules at the base station 105 or the controller 280 or other processors and modules at the UE 115 may perform or direct the execution of various processes for the techniques described herein, such as to perform or direct the execution illustrated in FIGS. 3-8, or other processes for the techniques described herein. The memories 242 and 282 may store data and program codes for the base station 105 and The UE 115, respectively. Scheduler 244 may schedule UEs for data transmission on the downlink or uplink.

In some cases, the UE 115 and the base station 105 may operate in a shared radio frequency spectrum band, which may include licensed or unlicensed, such as contention-based, frequency spectrum. In an unlicensed frequency portion of the shared radio frequency spectrum band, the UEs 115 or the base stations 105 may traditionally perform a medium-sensing procedure to contend for access to the frequency spectrum. For example, the UE 115 or base station 105 may perform a listen-before-talk or listen-before-transmitting (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. In some implementations, a CCA may include detection of specific sequences that indicate use of the channel. For example, another device may transmit a specific preamble prior to transmitting a data sequence. In some cases, an LBT procedure may include a wireless node adjusting its own back off window based on the amount of energy detected on a channel or the acknowledge or negative-acknowledge (ACK or NACK) feedback for its own transmitted packets as a proxy for collisions.

FIG. 3 is a block diagram of an example wireless communications system 300 that supports RMSI repetition or RMSI slot aggregation according to one or more aspects. In some examples, the wireless communications system 300 may implement aspects of the wireless network 100. The wireless communications system 300 includes the UE 115 and the base station 105. Although one UE 115 and one base station 105 are illustrated, in some other implementations, the wireless communications system 300 may generally include multiple UEs 115, and may include more than one base station 105.

The UE 115 can include a variety of components (such as structural, hardware components) used for carrying out one or more functions described herein. For example, these components can include one or more processors 302 (hereinafter referred to collectively as "the processor 302"), one or more memory devices 304 (hereinafter referred to collectively as "the memory 304"), one or more transmitters 308 (hereinafter referred to collectively as "the transmitter 308"), and one or more receivers 310 (hereinafter referred to collectively as "the receiver 310"). The processor 302 may be configured to execute instructions stored in the memory 304 to perform the operations described herein. In some implementations, the processor 302 includes or corresponds to one or more of the receive processor 258, the transmit processor 264, and the controller 280, and the memory 304 includes or corresponds to the memory 282.

The memory 304 may be configured to store predetermined configuration information 306. In some implementations, the predetermined configuration information 306 may be stored at the memory 304 prior to release or sale of the UE 115. Additionally or alternatively, in some implementations, the predetermined configuration information 306 is defined in a 3rd Generation Partnership Project (3GPP) wireless communication standard specification. The predetermined configuration information 306 may enable configuration of a particular CORESET at the UE 115 such as, for example, CORESET0. Additionally, the predetermined configuration information 306 may include information mapping one or more fields of messages included in a PDCCH or a PBCH to resources associated with RMSI repetition or RMSI slot aggregation, as further described herein.

The transmitter 308 is configured to transmit reference signals, control information and data to one or more other devices, and the receiver 310 is configured to receive reference signals, synchronization signals, control information and data from one or more other devices. For example, the transmitter 308 may transmit signaling, control information and data to, and the receiver 310 may receive signaling, control information and data from, the base station 105. In some implementations, the transmitter 308 and the receiver 310 may be integrated in one or more transceivers. Additionally or alternatively, the transmitter 308 or the receiver 310 may include or correspond to one or more components of the UE 115 described with reference to FIG. 2.

The base station 105 can include a variety of components (such as structural, hardware components) used for carrying out one or more functions described herein. For example, these components can include one or more processors 352 (hereinafter referred to collectively as "the processor 352"), one or more memory devices 354 (hereinafter referred to collectively as "the memory 354"), one or more transmitters 356 (hereinafter referred to collectively as "the transmitter 356"), and one or more receivers 358 (hereinafter referred to collectively as "the receiver 358"). The processor 352 may be configured to execute instructions stored in the memory 354 to perform the operations described herein. In some implementations, the processor 352 includes or corresponds to one or more of the receive processor 238, the transmit processor 220, and the controller 240, and the memory 354 includes or corresponds to the memory 242.

The transmitter 356 is configured to transmit reference signals, synchronization signals, control information, and data to one or more other devices, and the receiver 358 is configured to receive reference signals, control information and data from one or more other devices. For example, the transmitter 356 may transmit signaling, control information and data to, and the receiver 358 may receive signaling, control information and data from, the UE 115. In some implementations, the transmitter 356 and the receiver 358 may be integrated in one or more transceivers. Additionally or alternatively, the transmitter 356 or the receiver 358 may include or correspond to one or more components of base station 105 described with reference to FIG. 2.

In some implementations, the wireless communications system 300 implements a 5G NR network. For example, the wireless communications system 300 may include multiple 5G-capable UEs 115 and multiple 5G-capable base stations 105, such as UEs and base stations configured to operate in accordance with a 5G NR network protocol such as that defined by the 3GPP.

During operation of the wireless communications system 300, the base station 105 may determine to transmit RMSI to one or more UEs, such as the UE 115, using RMSI repetition or RMSI slot aggregation. For example, the base station 105 may be configured to support RMSI repetition, RMSI slot aggregation, or both. To further illustrate, based on a determination that there is RMSI, such as one or more RMSI messages, to be transmitted, the base station 105 may determine to transmit the RMSI using RMSI repetition or RMSI slot aggregation (or using both), such as based on a configuration of the base station 105, a configuration of the UE 115, other information, or a combination thereof. Based on the determination, the base station 105 generates DCI 372 and transmits an RMSI PDCCH 370 to the UE 115 that includes the DCI 372. As used herein, an "RMSI PDCCH" includes or corresponds to a PDCCH that is designated or scheduled for communication of RMSI control information.

The DCI 372 includes or indicates one or more resources, one or more parameters, or both resources and parameters, associated with RMSI repetition or RMSI slot aggregation. In some implementations, the DCI 372 includes one or more time resources (for example, one or more symbols, one or more time slots, one or more frames, one or more other time resources, or a combination thereof) associated with RMSI repetition or RMSI slot aggregation, one or more frequency resources (for example one or more frequency bands, one or more frequency subbands, one or more other frequency resources, or a combination thereof) associated with RMSI repetition or RMSI slot aggregation, one or more keying modes associated with RMSI repetition or RMSI slot aggregation, or a combination thereof. For example, the DCI 372 may indicate one or more timeslots during which RMSI repetitions or portions of a divided RMSI message are to be transmitted, one or more frequency bands or subbands via which RMSI repetitions or portions of a divided RMSI message are to be transmitted, a keying mode, such as quadrature phase shift keying (QPSK), used to transmit RMSI repetitions or portions of a divided RMSI message, other resources or parameters, or a combination thereof. In some other implementations, the DCI 372 may include one or more values that map to the one or more resources, the one or more parameters, or both, as further described herein.

The UE 115 may monitor one or more channels to receive the RMSI PDCCH 370. In some implementations, the base station 105 transmits the RMSI PDCCH 370 within a particular PDCCH common search space, such as a Type0-PDCCH common search space, as a non-limiting example. The Type0-PDCCH common search space is a subset of the NR PDCCH search space that is dedicated to the communication of system information messages, such as system information blocks (SIBs). In some implementations, the predetermined configuration information 306 indicates the resources or parameters associated with the Type0-PDCCH common search space. Because the Type0-PDCCH common search space is known to the UE 115, based on the predetermined configuration information 306, the UE 115 may monitor the Type0-PDCCH common search space to detect the RMSI PDCCH 370.

The UE 115 receives the RMSI PDCCH 370 and processes the DCI 372. The UE 115 may monitor for one or more RMSI PDSCHs based on the configuration of resources associated with RMSI repetition or RMSI slot aggregation indicated by the DCI 372. For example, the UE 115 may monitor a frequency band indicated by the DCI 372 at a time indicated by the DCI 372, as a non-limiting example. The base station 105 may transmit an RMSI PDSCH 374 to the UE 115 using the resources indicated by the DCI 372 and the UE 115 may receive and process the RMSI PDSCH 374 based on the monitoring. As used herein, an RMSI PDSCH includes or corresponds to a PDSCH that is designated or scheduled for communication of one or more RMSI messages.

The RMSI PDSCH 374 may include RMSI repetitions 376, a divided RMSI message 378, or both. For example, in implementations in which only one of RMSI repetition or RMSI slot aggregation is supported, used or configured for a given transmission, either the RMSI repetitions 376 or the divided RMSI message 378 may be included in the RMSI PDSCH 374, according to which of RMSI repetition or RMSI slot aggregation is supported, used or configured. In implementations in which both RMSI repetition and RMSI slot aggregation are supported, used or configured, the RMSI repetitions 376 and the divided RMSI message 378 are both included in the RMSI PDSCH 374 and are transmitted during different slots of a frame (or multiple frames).

As described above, in implementations that support RMSI repetition, the RMSI repetitions 376 may include an RMSI message and one or more repetitions, such as copies, of the RMSI message. In some implementations, each of the RMSI message and the one or more repetitions of the RMSI message may be included in a respective transport block (TB) that is communicated via the RMSI PDSCH 374. For example, the RMSI message may be included in a first TB of the RMSI PDSCH 374, and each of the one or more repetitions of the RMSI message may be included in a respective other TB of the RMSI PDSCH 374. The base station 105 may transmit the different TBs of the RMSI PDSCH 374 during different slots of a frame. For example, the base station 105 may transmit the first TB during a first slot of a frame, and the base station 105 may transmit each of the other TBs during a respective other slot of the frame.

The UE 115 may receive one or more of the RMSI message and one or more of the repetitions. The UE 115 may process the first of the RMSI message or repetitions that is successfully received, and the UE 115 may discard any additional repetitions that are received. Alternatively, the UE 115 may use one or more additional repetitions of the RMSI message that are successfully received to confirm or verify the RMSI message or repetition that was first successfully received. In some implementations, after transmitting the RMSI message and the one or more repetitions, the base station 105 may transmit a second RMSI message and one or more repetitions of the second RMSI message via the RMSI PDSCH 374, or via one or more other RMSI PDSCHs.

As described above, in implementations that support RMSI slot aggregation, the divided RMSI message 378 may include multiple portions of a single RMSI message. In some implementations, each portion of the divided RMSI message 378 may be included in a respective TB communicated via the RMSI PDSCH 374. For example, the base station 105 may transmit a first TB that includes a first portion of the divided RMSI message 378 and one or more other TBs that each include a respective other portion of the divided RMSI message 378. The base station 105 may transmit the TBs via the RMSI PDSCH 374. The base station 105 may transmit the different TBs of the RMSI PDSCH 374 during different slots of a frame. For example, the base station 105 may transmit the first TB during a first slot of a frame, and the base station 105 may transmit each of the other TBs during a respective other slot of the frame. The UE 115 may monitor the RMSI PDSCH 374 to receive the portions of the divided RMSI message 378.

After receiving one or more of the portions of the divided RMSI message 378, the UE 115 may aggregate the received portions to construct a full RMSI message. For example, the UE 115 may aggregate the first portion and the other portions to construct, or otherwise form, the divided RMSI message 378. Aggregating portions of the divided RMSI message 378 may include combining payloads extracted from the TBs included in the RMSI PDSCH 374 to reconstruct the divided RMSI message 378. In some implementations, after transmitting the divided RMSI message 378, the base station 105 may transmit a second divided RMSI message via the RMSI PDSCH 374, or via one or more other RMSI PDSCHs, during different respective slots of one or more other frames.

As described above, in some implementations, the DCI 372 includes the configuration of the resources associated with RMSI repetition or RMSI slot aggregation. In some other implementations, the DCI 372 includes one or more values that map to the configuration of resources associated with RMSI repetition or RMSI slot aggregation. In some such implementations, the base station 105 may transmit one or more configuration messages via a PBCH that indicate the mapping. To illustrate, the base station 105 may transmit, to the UE 115, a PBCH 380 that includes a configuration message 382 associated with a particular CORESET such as, for example, CORESET0. For example, the base station 105 may transmit the configuration message 382 via the PBCH 380 during configuration of the particular CORESET at the UE 115. One or more fields of the configuration message 382 may indicate a mapping between a value of one or more fields of the DCI 372 and resources, parameters, or both resources and parameters associated with RMSI repetition or RMSI slot aggregation. For example, a multi-bit value, such as a two- or three-bit value, of a field of the DCI 372 may be associated with a particular resource configuration used to perform RMSI repetition or RMSI slot aggregation, and this association may be indicated by a portion of the configuration message 382. Additionally, the configuration message 382 may indicate information used to enable configuration of the particular CORESET, such as CORESET0, at the UE 115.

In some other implementations, a mapping of the values of the one or more fields of the DCI 372 to the configuration of resources associated with RMSI repetition or RMSI slot aggregation is indicated in another manner. In one such example, one or more reserved bits of a PBCH may indicate the mapping. For example, the PBCH 380 may include reserved bits 384 that indicate the configuration of resources associated with RMSI repetition or RMSI slot aggregation and the mapping between the configuration of resources and values of the one or more fields of the DCI 372. Although described as reserved bits of the PBCH 380, such reserved bits may be included in a message communicated via the PBCH 380, such as the configuration message 382 or another type of message. The reserved bits 384 may be designated as reserved in a previous version of a 3GPP wireless communication standard specification.

As another example, the PBCH 380 may include the configuration message 382, and one or more fields of the configuration message 382 may indicate the mapping of the values of the one or more fields of the DCI 372 to the resource configuration associated with RMSI repetition or RMSI slot aggregation, in addition to the information enabling configuration of the particular CORESET at the UE 115. In some such implementations, instead of including the mapping information in the configuration message 382, one or more fields of the configuration message 382 may be interpretable, by the UE 115, to indicate the mappings. For example, values of the one or more fields of the configuration message 382 may be associated with a respective mapping to be used by the UE 115 to determine the resource configuration to use to receive RMSI repetitions or a divided RMSI message across multiple slots. As such, the respective mapping may be designated by information distinct from the information included in the configuration message 382.

In some implementations, the UE 115 interprets the one or more fields of the configuration message 382 based on the predetermined configuration information 306 stored at the memory 304. The predetermined configuration information 306 includes information that enables configuration of one or more CORESETs, such as CORESET0. In some implementations, the predetermined configuration information 306 includes or corresponds to one or more tables. Rows and columns of the tables indicate information used to configure one or more CORESETs at the UE 115, such as resources or parameters associated with the CORESETs. In some implementations, the one or more tables include information for configuring at least CORESET0. In some implementations, the one or more tables include or correspond to configuration tables of PDCCH monitoring occasions for the Type0-PDCCH common space and include information for synchronization signals (SS) and PBCH block and CORESET multiplexing for a particular pattern and a particular frequency range, such as pattern 1 and frequency range 2.

In some implementations, a table of the predetermined configuration information 306 includes a first column that indicates a first interpretation of the one or more fields of the configuration message 382 that is to be used by legacy UEs (also referred to herein as a first type of UEs) that do not support RMSI repetition or RMSI slot aggregation. The first column may be referred to as a "regular" column of the table and may include mappings for resource configurations used to receive a single RMSI message during a single slot of a frame. The table also includes a second column that indicates a second interpretation of the one or more fields that is to be used by UEs configured to support RMSI repetition or RMSI slot aggregation (also referred to herein as a second type of UEs). The second column may be referred to as a "special" column and may include mappings for resource configurations used to receive repetitions of RMSI messages or a divided RMSI message across multiple slots of a frame.

If a legacy UE receives the configuration message 382, the legacy UE may interpret the one or more fields of the configuration message 382 based on the regular column, and may ignore the special column. However, if a UE that is configured to support RMSI repetition or RMSI slot aggregation, such as the UE 115, receives the configuration message 382, the UE 115 may interpret the one or more fields of the configuration message 382 based on the special column. For example, a field of the configuration message 382 may include the value "0111," and the UE 115 may interpret "0111" based on the special column of the table of the predetermined configuration information 306 to determine that RMSI repetition or RMSI slot aggregation is to be used and to identify a configuration of resources, indicated by the table, that is associated with RMSI repetition or RMSI slot aggregation. The predetermined configuration information 306, including the table, may be specified by a 3GPP wireless communication standard specification, or another wireless communication standard specification. In this manner, UEs that are configured to support RMSI repetition or RMSI slot aggregation may determine the respective resource configurations by interpreting the configuration message 382 based on the predetermined configuration information 306 to identify a particular resource configuration that maps to the values of one or more fields of the DCI 372. Additionally, legacy UEs may determine a resource configuration associated with transmission of a single RMSI message by interpreting a the configuration message 382 based on the predetermined configuration information 306 to identify a particular resource configuration that maps to one or more values of the DCI 372.

As described with reference to FIG. 3, the present disclosure provides techniques for enabling RMSI repetition or RMSI slot aggregation. For example, the DCI 372 may indicate a resource configuration associated with RMSI repetition or RMSI slot aggregation that is used to transmit the RMSI PDSCH 374, which includes the RMSI repetitions 376, the divided RMSI message 378, or both (if both RMSI repetition and RMSI slot aggregation are configured). By using RMSI repetition or RMSI slot aggregation, a likelihood that UEs, such as the UE 115, receive the information in an RMSI message is increased because there are more opportunities (via different repetitions or different portions across different slots) for the UEs to successfully receive and decode the information. In this manner, coverage of the RMSI messages is improved, which may enable communications to and from UEs at the edge of a coverage area of the wireless communications system 300.

Figures 4A, 4B:
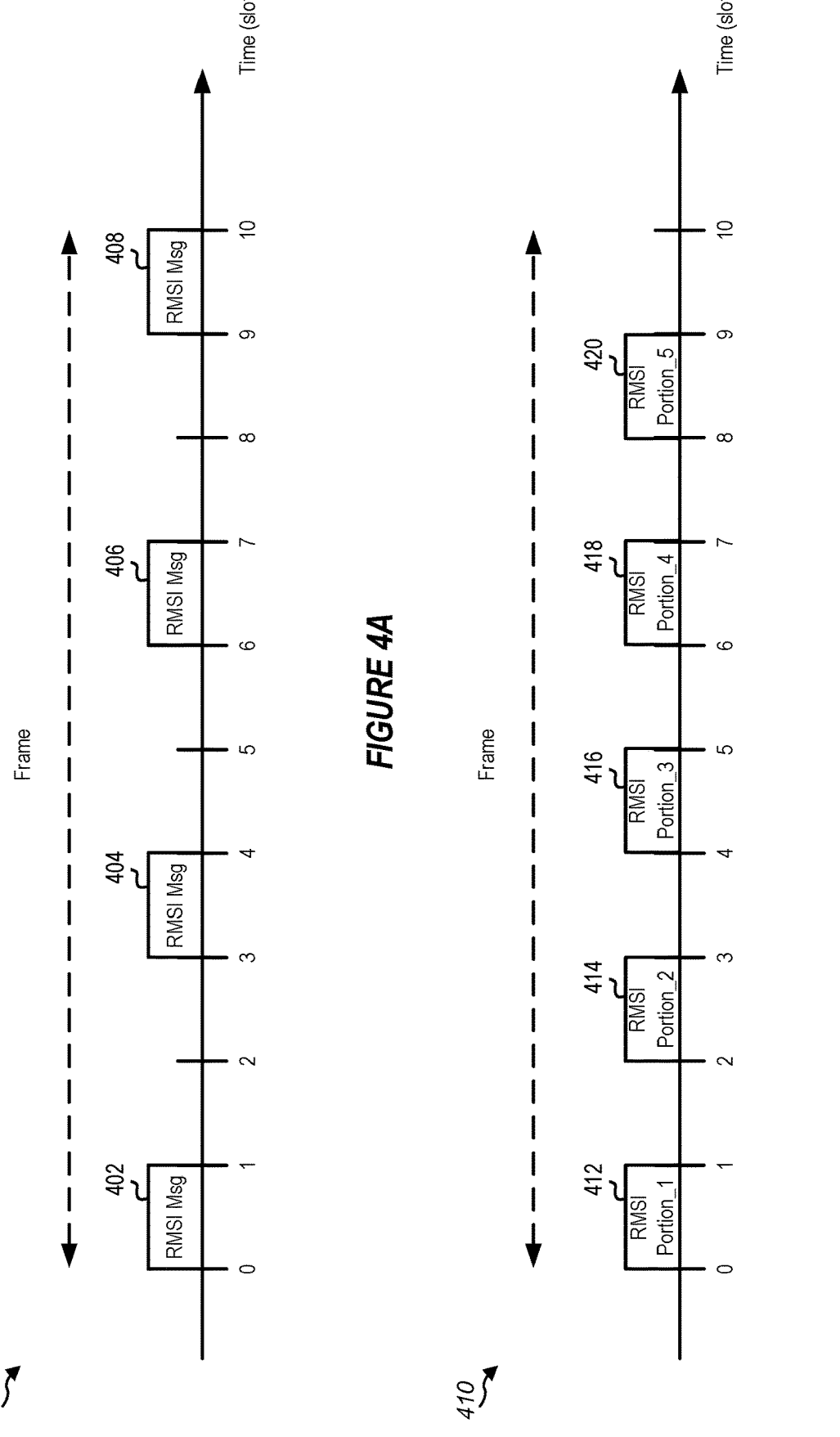
FIGS. 4A and 4B are timelines of examples of RMSI repetition and RMSI slot aggregation, respectively, according to one or more aspects.

FIGS. 4A and 4B are timelines of examples of RMSI repetition and RMSI slot aggregation, respectively, according to one or more aspects. FIG. 4A depicts a timeline 400 that illustrates an example of RMSI repetition as described above. In the example of FIG. 4A, an illustrative frame includes ten slots. In other implementations, a frame may include fewer than ten or more than ten slots. As described above, a base station may transmit, and a UE may receive, multiple repetitions of an RMSI message during respective slots of the frame. For example, as shown in FIG. 4A, the UE may receive one or more of a first RMSI repetition 402 during a first slot (slot 0), a second RMSI repetition 404 during a fourth slot (slot 3), a third RMSI repetition 406 during a seventh slot (slot 6), and a fourth RMSI repetition 408 during a tenth slot (slot 9). During a second, third, fifth, sixth, eighth, and ninth slot, no RMSI repetitions may be transmitted or received. In such an example, the DCI 372 of FIG. 3 may indicate RMSI repetition and the first, fourth, seventh, and tenth slots, as described above. Each of the RMSI repetitions 402, 404, 406, and 408 may be an individual copy or repetition of the same RMSI message, such that each of the RMSI repetitions 402, 404, 406, and 408 includes the same information. In other implementations, the RMSI repetition may occur more than four or fewer than four times and may occur during different slots than shown in FIG. 4A. Use of RMSI repetition may enable UEs, such as UEs at an edge of a coverage area, to receive RMSI by receiving only one (or less than all) of multiple repetitions of an RMSI message.

FIG. 4B depicts a timeline 410 that illustrates an example of RMSI slot aggregation as described above. In the example of FIG. 4B, an illustrative frame includes ten slots. In other implementations, a frame may include fewer than ten or more than ten slots. As described above, a base station may divide an RMSI message into multiple different portions, and the base station may transmit, and a UE may receive, the portions of the RMSI message during respective slots of the frame. For example, as shown in FIG. 4B, the base station may transmit a first RMSI portion 412 during a first slot (slot 0), a second RMSI portion 414 during a third slot (slot 2), a fourth RMSI portion 416 during a fifth slot (slot 4), a fourth RMSI portion 418 during a seventh slot (slot 6), and a fifth RMSI portion 420 during a ninth slot (slot 8). During a second, fourth, sixth, eighth, and tenth slot, no RMSI portions may be transmitted or received. In such an example, the DCI 372 of FIG. 3 may indicate RMSI slot aggregation and the first, third, fifth, seventh, and ninth slots, as described above. Each of the RMSI portions 412, 414, 416, 418, and 420 may represent respective parts of a single RMSI message. For example, the base station may divide an RMSI message into five distinct portions, such that all (or some) of the RMSI portions 412-420 include the different information. In other implementations, the base station may divide the RMSI message into more than five or fewer than five portions for transmission during different slots than shown in FIG. 4B. The UE may construct the RMSI message by aggregating the first RMSI portion 412, the second RMSI portion 414, the third RMSI portion 416, the fourth RMSI portion 418, and the fifth RMSI portion 420. If the UE fails to successfully receive at least one of the RMSI portions 412-420, the UE may aggregate the successfully received portions to construct a partial RMSI message. Thus, use of RMSI slot aggregation may improve coverage at UEs, such as UEs at an edge of a coverage area, due to the ability to construct at least a partial RMSI message based on the received RMSI portions, as compared to missing an entirety of an RMSI message if the UEs fail to receive the single RMSI message at the scheduled time.

FIG. 5 is a flow diagram illustrating an example process 500 that supports RMSI repetition or RMSI slot aggregation according to one or more aspects. Operations of the process 500 may be performed by a UE, such as the UE 115 described above with reference to FIGS. 1-3. For example, example operations (also referred to as "blocks") of the process 500 may enable the UE to receive one or more RMSI messages that are transmitted using RMSI repetition or RMSI slot aggregation, according to some aspects of the present disclosure.

Figure 6:
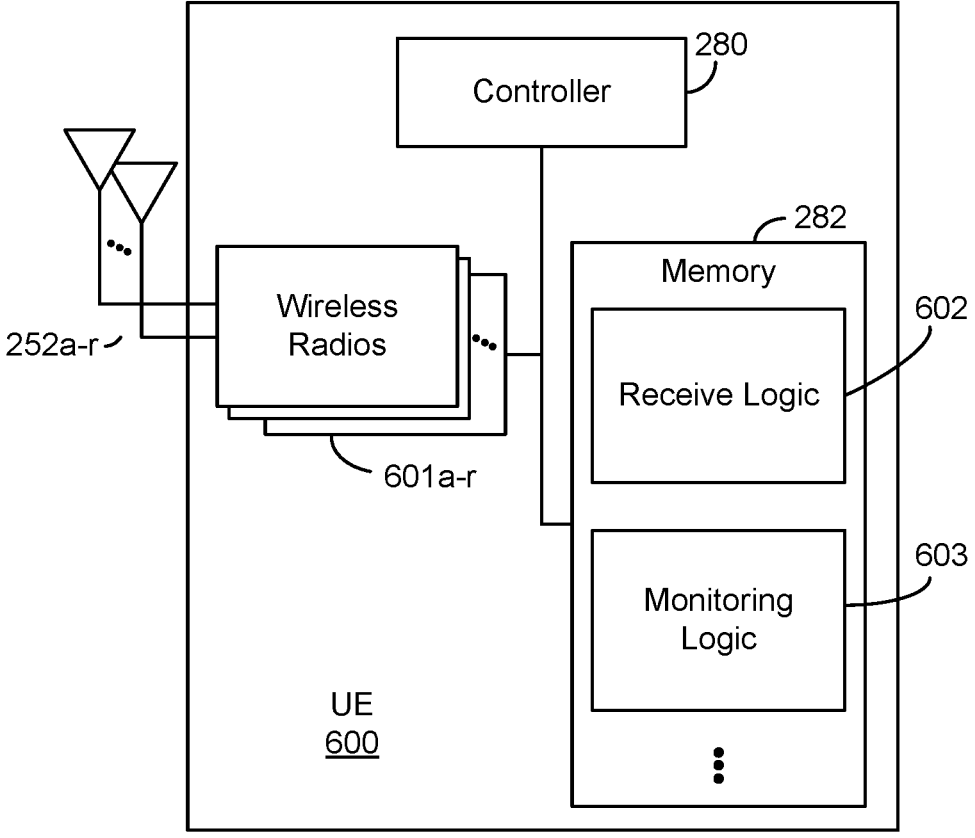
FIG. 6 is a block diagram of an example UE that supports RMSI repetition or RMSI slot aggregation according to one or more aspects.

FIG. 6 is a block diagram of an example UE 600 that supports RMSI repetition or RMSI slot aggregation according to one or more aspects. The UE 600 may be configured to perform operations, including the blocks of the process 500 described with reference to FIG. 5, to receive one or more RMSI messages that are transmitted using RMSI repetition or RMSI slot aggregation. In some implementations, the UE 600 includes the structure, hardware, and components shown and described with reference to the UE 115 of FIG. 2 or 3. For example, the UE 600 includes the controller 280, which operates to execute logic or computer instructions stored in the memory 282, as well as controlling the components of the UE 600 that provide the features and functionality of the UE 600. The UE 600, under control of the controller 280, transmits and receives signals via wireless radios 601a-r and the antennas 252a-r. The wireless radios 601a-r include various components and hardware, as illustrated in FIG. 2 for the UE 115, including the modulator and demodulators 254a-r, the MIMO detector 256, the receive processor 258, the transmit processor 264, and the TX MIMO processor 266.

Figure 8:
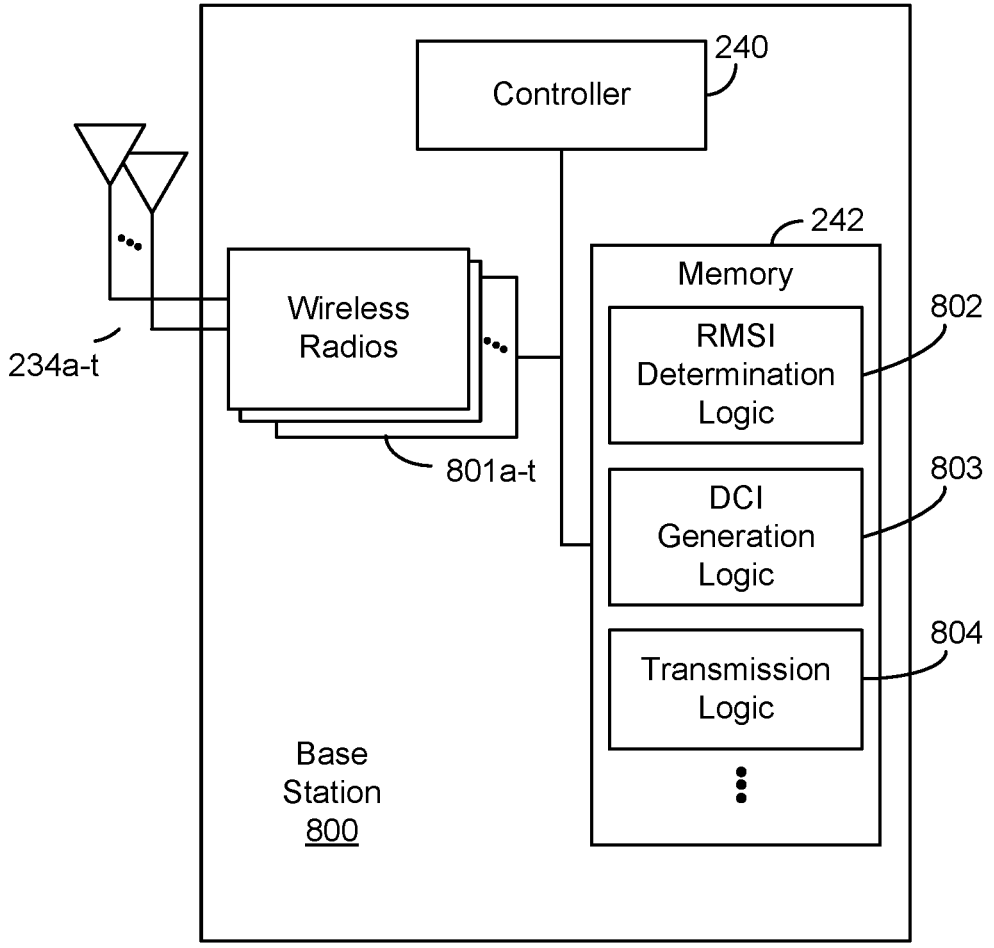
FIG. 8 is a block diagram of an example base station that supports RMSI repetition or RMSI slot aggregation according to one or more aspects.

As shown, the memory 282 may include receive logic 602 and monitoring logic 603. The receive logic 602 and the monitoring logic 603 may include or correspond to the processor 302, the memory 304, and the receiver 310. The receive logic 602 may be configured to enable receipt, by the UE 600, of one or more signals. The monitoring logic 603 may be configured to enable the UE 600 to monitor one or more channels for receipt of one or more RMSI messages. The UE 600 may receive signals from or transmit signals to one or more base stations, such as the base station 105 of FIGS. 1-3 or a base station as illustrated in FIG. 8.

Referring back to the process 500 of FIG. 5, in block 502, the UE 600 receives, from a base station, an RMSI PDCCH that includes DCI. The DCI indicates a configuration of resources associated with RMSI repetition or RMSI slot aggregation. For example, the UE 600 may receive an RMSI PDCCH via the wireless radios 601a-r and the antennas 252a-r. To further illustrate, the UE 600 may execute, under control of the controller 280, the receive logic 602 stored in the memory 282. The execution environment of the receive logic 602 provides the functionality to receive an RMSI PDCCH that includes DCI from a base station. The DCI includes a configuration of resources associated with RMSI repetition or RMSI slot aggregation.

In block 504, the UE 600 monitors for one or more RMSI messages based on the configuration of resources indicated in the DCI. The monitoring in block 504 includes monitoring for multiple repetitions of an RMSI message based on the configuration of resources being associated with RMSI repetition and monitoring for a single RMSI message that is divided across multiple slots based on the configuration of resources being associated with RMSI slot aggregation. To illustrate, the UE 600 may execute, under control of the controller 280, the monitoring logic 603 stored in the memory 282. The execution environment of the monitoring logic 603 provides the functionality to monitor for one or more RMSI messages based on the configuration of resources. In some implementations, the configuration of resources includes one or more time resources (for example, one or more symbols, one or more time slots, one or more frames, other time resources, or a combination thereof) associated with RMSI repetition or RMSI slot aggregation, one or more frequency resources (for example, one or more frequency bands, one or more frequency subbands, other frequency resources, or a combination thereof) associated with RMSI repetition or RMSI slot aggregation, one or more keying modes (for example, binary phase shift keying (BPSK) or quadrature phase shift keying (QPSK)) associated with RMSI repetition or RMSI slot aggregation, or a combination thereof.

In implementations in which the configuration of resources is associated with RMSI repetition, the process 500 further includes receiving, from the base station based on the monitoring in block 504, an RMSI PDSCH that includes multiple TBs including the multiple repetitions of the RMSI message. In some such implementations, each repetition of the RMSI message is included in a respective TB of the multiple TBs. In some such implementations, receiving the RMSI PDSCH includes receiving the each TB of the multiple TBs during a respective slot of a frame.

In implementations in which the configuration of resources is associated with RMSI slot aggregation, the process 500 further includes receiving, from the base station based on the monitoring in block 504, multiple TBs including via an RMSI PDSCH. Each TB of the multiple TBs includes a respective portion of the single RMSI message. In some such implementations, each TB of the multiple TBs is received during a respective slot of a frame. In some such implementations, the process 500 further includes aggregating the portions of the single RMSI message that are included in the multiple TBs to construct the single RMSI message.

In some implementations, the process 500 further includes monitoring a Type0-PDCCH common search space. Receiving the RMSI PDCCH is based on the monitoring. Additionally or alternatively, the process 500 may include receiving, from the base station, a PBCH that includes a configuration message associated with a particular CORESET. One or more fields of the configuration message may indicate a mapping between a value of one or more fields of the DCI and resources, parameters, or both resources and parameters associated with RMSI repetition or RMSI slot aggregation. In some such implementations, the particular CORESET is CORESET0. Alternatively, the PBCH may include one or more reserved bits indicating the configuration of resources associated with RMSI repetition or RMSI slot aggregation.

In some other implementations in which the process 500 further includes receiving a PBCH that includes a configuration message associated with a particular CORESET, the process 500 further includes interpreting one or more fields of the configuration message based on predetermined configuration information stored at the UE 600. In some such implementations, the predetermined configuration information includes a table. As described above, a first column of the table may indicate a first interpretation of the one or more fields that is to be used by a first type of UEs, such as legacy UEs, and a second column of the table may indicate a second interpretation of the one or more fields that is to be used by a second type of UEs, such as UEs configured to support RMSI repetition or RMSI slot aggregation, such as the UE 600. In some such implementations, the predetermined configuration information indicates a mapping between a value of one or more fields of the DCI received in block 502 and resources, parameters, or both resources and parameters associated with RMSI repetition or RMSI slot aggregation used for transmitting the RMSI message the UE 600 is monitoring for in block 504. As described above, the particular CORESET may be CORESET0 and the predetermined configuration information may be specified by a 3GPP wireless communication standard specification.

FIG. 7 is a flow diagram illustrating an example process 700 that supports RMSI repetition or RMSI slot aggregation according to one or more aspects. Operations of the process 700 may be performed by a base station, such as the base station 105 described above with reference to FIGS. 1-3. For example, example operations of the process 700 may enable a base station to transmit, to one or more UEs, an RMSI PDSCH that includes multiple repetitions of an RMSI message or a single RMSI message that is divided across multiple slots.

FIG. 8 is a block diagram of an example base station 800 that supports RMSI repetition or RMSI slot aggregation according to one or more aspects. The base station 800 may be configured to perform operations, including the blocks of the process 700 described with reference to FIG. 7, to transmit, and enable one or more UEs to receive, one or more RMSI messages using RMSI repetition or RMSI slot aggregation. In some implementations, the base station 800 includes the structure, hardware, and components shown and described with reference to the base station 105 of FIGS. 1-3. For example, the base station 800 may include the controller 240, which operates to execute logic or computer instructions stored in the memory 242, as well as controlling the components of the base station 800 that provide the features and functionality of the base station 800. The base station 800, under control of the controller 240, transmits and receives signals via wireless radios 801a-t and the antennas 234a-t. The wireless radios 801a-t include various components and hardware, as illustrated in FIG. 2 for the base station 105, including the modulator and demodulators 232a-t, the transmit processor 220, the TX MIMO processor 230, the MIMO detector 236, and the receive processor 238.

As shown, the memory 242 may include RMSI determination logic 802, DCI generation logic 803, and transmission logic 804. The RMSI determination logic 802, the DCI generation logic 803, and the transmission logic 804 may include or correspond to the processor 352, the memory 354, and the transmitter 356. The RMSI determination logic 802 may be configured to determine to transmit RMSI using RMSI repetition or RMSI slot aggregation. The DCI generation logic 803 may be configured to generate DCI that indicates a configuration of resources associated with RMSI repetition or RMSI slot aggregation. The transmission logic 804 is configured to transmit the DCI via an RMSI PDCCH and to transmit an RMSI PDSCH that includes multiple repetitions of an RMSI message or a single RMSI message that is divided across multiple slots. The base station 800 may receive signals from or transmit signals to one or more UEs, such as the UE 115 of FIGS. 1-3 or the UE 600 of FIG. 6.

Referring back to the process 700 of FIG. 7, in block 702, the base station 800 determines to transmit RMSI to one or more UEs using RMSI repetition or RMSI slot aggregation. To illustrate, the base station 800 may execute, under control of the controller 240, the RMSI determination logic 802 stored in the memory 242. The execution environment of the RMSI determination logic 802 provides the functionality to determine to transmit RMSI to one or more UEs using RMSI repetition or RMSI slot aggregation.

In block 704, the base station 800 generates DCI that indicates a configuration of resources associated with RMSI repetition or RMSI slot aggregation. To illustrate, the base station 800 may execute, under control of the controller 240, the DCI generation logic 803 stored in the memory 242. The execution environment of the DCI generation logic 803 provides the functionality to generate DCI that indicates a configuration of resources associated with RMSI repetition or RMSI slot aggregation.

In block 706, the base station 800 transmits, to the one or more UEs, the DCI via an RMSI PDCCH. To illustrate, the base station 800 may execute, under control of the controller 240, the transmission logic 804 stored in the memory 242. The execution environment of the transmission logic 804 provides the functionality to transmit, to the one or more UEs, the DCI via an RMSI PDCCH.

In block 708, the base station 800 transmits, to the one or more UEs, an RMSI PDSCH that includes multiple repetitions of an RMSI message based on determining to transmit the RMSI using RMSI repetition and a single RMSI message that is divided across multiple slots based on determining to transmit the RMSI using RMSI slot aggregation. To illustrate, the base station 800 may execute, under control of the controller 240, the transmission logic 804 stored in the memory 242. The execution environment of the transmission logic 804 provides the functionality to transmit, to the one or more UEs, an RMSI PDSCH that includes multiple repetitions of an RMSI message based on determining to transmit the RMSI using RMSI repetition and a single RMSI message that is divided across multiple slots based on determining to transmit the RMSI using RMSI slot aggregation. In some implementations, blocks 702 and 704 are optional, and the process 700 may include the transmission operations described with reference to blocks 706 and 708, such as transmitting an RMSI PDCCH that includes DCI indicating a configuration of resources associated with RMSI repetition or RMSI slot aggregation and transmitting an RMSI PDSCH over the resources using RMSI repetition or RMSI slot aggregation according to the configuration of resources.

In some implementations, the configuration of resources includes one or more time resources (for example, one or more symbols, one or more time slots, one or more frames, other time resources, or a combination thereof) associated with RMSI repetition or RMSI slot aggregation, one or more frequency resources (for example, one or more frequency bands, one or more frequency subbands, other frequency resources, or a combination thereof) associated with RMSI repetition or RMSI slot aggregation, one or more keying modes (for example, binary phase shift keying (BPSK) or quadrature phase shift keying (QPSK)) associated with RMSI repetition or RMSI slot aggregation, or a combination thereof.

In implementations in which the DCI indicates that the configuration of resources is associated with RMSI repetition, the RMSI message is included in a first TB of the RMSI PDSCH, and each of one or more repetitions of the RMSI message is included in a respective other TB of the RMSI PDSCH. In some such implementations, the first TB is transmitted during a first slot of a frame and each of the other TBs is transmitted during a respective other slot of the frame.

In implementations in which the DCI indicates that the configuration of resources is associated with RMSI slot aggregation, the transmitting in block 708 includes transmitting a first TB including a first portion of the single RMSI message via the RMSI PDSCH and transmitting one or more other TBs each including a respective other portion of the single RMSI message via the RMSI PDSCH. In some such implementations, the first TB is transmitted during a first slot of a frame and each of the other TBs is transmitted during a respective other slot of the frame.

In some implementations, the RMSI PDCCH is transmitted within a Type0-PDCCH common search space. Additionally or alternatively, the process 700 may include transmitting, to the one or more UEs, a PBCH that includes a configuration message associated with a particular CORESET. One or more fields of the configuration message may indicate a mapping between a value of one or more fields of the DCI and resources, parameters, or both resources and parameters associated with RMSI repetition or RMSI slot aggregation. In some such implementations, the particular CORESET is CORESET0. Alternatively, the PBCH may include one or more reserved bits indicating the configuration of resources associated with RMSI repetition or RMSI slot aggregation.

In some other implementations in which the process 700 further includes transmitting a PBCH that includes a configuration message associated with a particular CORESET, one or more fields of the configuration message are interpretable based on predetermined configuration information stored at the UE. In some such implementations, the predetermined configuration information includes a table. As described above, a first column of the table may indicate a first interpretation of the one or more fields that is to be used by a first type of UEs, such as legacy UEs, and a second column of the table may indicate a second interpretation of the one or more fields that is to be used by a second type of UEs, such as UEs configured to support RMSI repetition or RMSI slot aggregation. In some such implementations, the predetermined configuration information indicates a mapping between a value of one or more fields of the DCI and resources, parameters, or both resources and parameters corresponding to RMSI repetition or RMSI slot aggregation used for transmitting the RMSI message in block 708. As described above, the particular CORESET may be CORESET0 and the predetermined configuration information may be specified by a 3GPP wireless communication standard specification.

It is noted that one or more blocks (or operations) described with reference to FIGS. 5 and 7 may be combined with one or more blocks (or operations) described with reference to another of the figures. For example, one or more blocks (or operations) of FIG. 5 may be combined with one or more blocks (or operations) of FIG. 7. As another example, one or more blocks associated with FIG. 5 or 7 may be combined with one or more blocks (or operations) associated with FIG. 2 or 3. Additionally, or alternatively, one or more operations described above with reference to FIGS. 1-7 may be combined with one or more operations described with reference to FIG. 8.

In some aspects, techniques for enabling RMSI repetition or RMSI slot aggregation may include additional aspects, such as any single aspect or any combination of aspects described below or in connection with one or more other processes or devices described elsewhere herein. In some aspects, enabling RMSI repetition or RMSI slot aggregation may include an apparatus configured to receive, from a base station, an RMSI PDCCH that includes DCI. The DCI indicates a configuration of resources associated with RMSI repetition or RMSI slot aggregation. The apparatus is also configured to monitor for one or more RMSI messages based on the configuration of resources. The monitoring includes monitoring for multiple repetitions of an RMSI message based on the configuration of resources being associated with RMSI repetition and monitoring for a single RMSI message that is divided across multiple slots based on the configuration of resources being associated with RMSI slot aggregation. In some implementations, the apparatus includes a wireless device, such as a UE or a component of a UE. In some implementations, the apparatus may include at least one processor, and a memory coupled to the processor. The processor may be configured to perform operations described herein with respect to the wireless device. In some other implementations, the apparatus may include a non-transitory computer-readable medium having program code recorded thereon and the program code may be executable by a computer for causing the computer to perform operations described herein with reference to the wireless device. In some implementations, the apparatus may include one or more means configured to perform operations described herein.

In a first aspect, the configuration of resources includes one or more time resources associated with RMSI repetition or RMSI slot aggregation, one or more frequency resources associated with RMSI repetition or RMSI slot aggregation, one or more keying modes associated with RMSI repetition or RMSI slot aggregation, or a combination thereof.

In a second aspect, alone or in combination with the first aspect, the configuration of resources is associated with RMSI repetition and the apparatus receives, from the base station, an RMSI PDSCH that includes multiple TBs including the multiple repetitions of the RMSI message.

In a third aspect, in combination with the second aspect, each repetition of the RMSI message is included in a respective TB of the multiple TBs.

In a fourth aspect, in combination with the third aspect, the apparatus receives each TB of the multiple TBs during a respective slot of a frame.

In a fifth aspect, alone or in combination with one or more of the first through fourth aspects, the configuration of resources is associated with RMSI slot aggregation and the apparatus receives, from the base station, multiple TBs via an RMSI PDSCH. Each TB of the multiple TBs include a respective portion of the single RMSI message.

In a sixth aspect, in combination with the fifth aspect, the apparatus receives each TB of the multiple TBs during a respective slot of a frame.

In a seventh aspect, in combination with the fifth aspect, the apparatus aggregates the portions of the single RMSI message that are included in the multiple TBs to construct the single RMSI message.

In an eighth aspect, alone or in combination with one or more of the first through seventh aspects, the apparatus monitors a Type0-PDCCH common search space. The RMSI PDCCH is received based on the monitoring.

In a ninth aspect, alone or in combination with one or more of the first through eighth aspects, the apparatus receives, from the base station, a PBCH that includes a configuration message associated with a particular CORESET. One or more fields of the configuration message indicate a mapping between a value of one or more fields of the DCI and resources, parameters, or both resources and parameters associated with RMSI repetition or RMSI slot aggregation.

In a tenth aspect, in combination with the ninth aspect, the particular CORESET is CORESET0.

In an eleventh aspect, alone or in combination with one or more of the first through tenth aspects, the apparatus receives, from the base station, a PBCH. One or more reserved bits of the PBCH indicate the configuration of resources associated with RMSI repetition or RMSI slot aggregation.

In a twelfth aspect, alone or in combination with one or more of the first through eleventh aspects, the apparatus receives, from the base station, a PBCH that includes a configuration message associated with a particular CORESET and interprets one or more fields of the configuration message based on predetermined configuration information stored at the UE.

In a thirteenth aspect, in combination with the twelfth aspect, the predetermined configuration information includes a table, a first column of the table indicates a first interpretation of the one or more fields that is to be used by a first type of UEs, and a second column of the table indicates a second interpretation of the one or more fields that is to be used by a second type of UEs that are configured to support RMSI repetition or RMSI slot aggregation.

In a fourteenth aspect, alone or in combination with one or more of the twelfth through thirteenth aspects, the predetermined configuration information indicates a mapping between a value of one or more fields of the DCI and resources, parameters, or both resources and parameters associated with RMSI repetition or RMSI slot aggregation.

In a fifteenth aspect, alone or in combination with one or more of the twelfth through fourteenth aspects, the particular CORESET is CORESET0.

In a sixteenth aspect, alone or in combination with one or more of the twelfth through fifteenth aspects, the predetermined configuration information is specified by a 3GPP wireless communication standard specification.

In some aspects, an apparatus configured for wireless communication, such as a base station, is configured to determine to transmit RMSI to one or more UEs using RMSI repetition or RMSI slot aggregation. The apparatus is also configured to generate DCI that indicates a configuration of resources associated with RMSI repetition or RMSI slot aggregation. The apparatus is configured to transmit, to the one or more UEs, the DCI via an RMSI PDCCH. The apparatus is further configured to transmit, to the one or more UEs, an RMSI PDSCH that includes multiple repetitions of an RMSI message based on determining to transmit the RMSI using RMSI repetition and a single RMSI message divided across multiple slots based on determining to transmit the RMSI using RMSI slot aggregation. In some implementations, the apparatus includes a wireless device, such as a base station. In some implementations, the apparatus may include at least one processor, and a memory coupled to the processor. The processor may be configured to perform operations described herein with respect to the wireless device. In some other implementations, the apparatus may include a non-transitory computer-readable medium having program code recorded thereon and the program code may be executable by a computer for causing the computer to perform operations described herein with reference to the wireless device. In some implementations, the apparatus may include one or more means configured to perform operations described herein.

In a seventeenth aspect, the configuration of resources includes one or more time resources associated with RMSI repetition or RMSI slot aggregation, one or more frequency resources associated with RMSI repetition or RMSI slot aggregation, one or more keying modes associated with RMSI repetition or RMSI slot aggregation, or a combination thereof.

In an eighteenth aspect, alone or in combination with the seventeenth aspect, the DCI indicates that the configuration of resources is associated with RMSI repetition, the RMSI message is included in a first TB of the RMSI PDSCH, and each of one or more repetitions of the RMSI message is included in a respective other TB of the RMSI PDSCH.

In a nineteenth aspect, in combination with the eighteenth aspect, the apparatus transmits the first TB during a first slot of a frame and transmits each of the other TBs during a respective other slot of the frame.

In a twentieth aspect, alone or in combination with one or more of the seventeenth through nineteenth aspects, the DCI indicates that the configuration of resources is associated with RMSI slot aggregation and transmitting the single RMSI message includes transmitting, to the one or more UEs, a first TB including a first portion of the single RMSI message via the RMSI PDSCH and transmitting, to the one or more UEs, one or more other TBs each including a respective other portion of the single RMSI message via the RMSI PDSCH.

In a twenty-first aspect, in combination with the twentieth aspect, the apparatus transmits the first TB during a first slot of a frame and transmits each of the other TBs during a respective other slot of the frame.

In a twenty-second aspect, alone or in combination with one or more of the seventeenth through twenty-first aspects, the RMSI PDCCH is transmitted within a Type0-PDCCH common search space.

In a twenty-third aspect, alone or in combination with one or more of the seventeenth through twenty-second aspects, the apparatus transmits, to the one or more UEs, a PBCH that includes a configuration message associated with a particular CORESET. One or more fields of the configuration message indicate a mapping between a value of one or more fields of the DCI and resources, parameters, or both resources and parameters associated with RMSI repetition or RMSI slot aggregation.

In a twenty-fourth aspect, in combination with the twenty-third aspect, the particular CORESET is CORESET0.

In a twenty-fifth aspect, alone or in combination with one or more of the seventeenth through twenty-fourth aspects, the apparatus transmits, to the one or more UEs, a PBCH. One or more reserved bits of the PBCH indicate the configuration of resources associated with RMSI repetition or RMSI slot aggregation.

In a twenty-sixth aspect, alone or in combination with one or more of the seventeenth through twenty-fifth aspects, the apparatus transmits, to the one or more UEs, a PBCH that includes a configuration message associated with a particular CORESET. One or more fields of the configuration message are interpretable based on predetermined configuration information stored at the UE.

In a twenty-seventh aspect, in combination with the twenty-sixth aspect, the predetermined configuration information includes a table, a first column of the table indicates a first interpretation of the one or more fields that is to be used by a first type of UEs, and a second column of the table indicates a second interpretation of the one or more fields that is to be used by a second type of UEs that are configured to support RMSI repetition or RMSI slot aggregation.

In a twenty-eighth aspect, alone or in combination with one or more of the twenty-sixth through twenty-seventh aspects, the predetermined configuration information indicates a mapping between a value of one or more fields of the DCI and resources, parameters, or both resources and parameters corresponding to RMSI repetition or RMSI slot aggregation.

In a twenty-ninth aspect, alone or in combination with one or more of the twenty-sixth through twenty-eighth aspects, the particular CORESET is CORESET0.

In a thirtieth aspect, alone or in combination with one or more of the twenty-sixth through twenty-ninth aspects, the predetermined configuration information is specified by a 3GPP wireless communication standard specification.

In some aspects, an apparatus configured for wireless communication, such as a base station, is configured to transmit, to one or more UEs, an RMSI PDCCH that includes DCI indicating a configuration of resources associated with RMSI repetition or RMSI slot aggregation. The apparatus is further configured to transmit, to the one or more UEs, an RMSI PDSCH over the resources using RMSI repetition or RMSI slot aggregation according to the configuration of resources. The transmitting includes transmitting multiple repetitions of an RMSI message based on using RMSI repetition and transmitting a single RMSI message divided across multiple slots based on using RMSI slot aggregation. In some implementations, the apparatus includes a wireless device, such as a base station. In some implementations, the apparatus may include at least one processor, and a memory coupled to the processor. The processor may be configured to perform operations described herein with respect to the wireless device. In some other implementations, the apparatus may include a non-transitory computer-readable medium having program code recorded thereon and the program code may be executable by a computer for causing the computer to perform operations described herein with reference to the wireless device. In some implementations, the apparatus may include one or more means configured to perform operations described herein.

In a thirty-first aspect, the configuration of resources includes one or more time resources associated with RMSI repetition or RMSI slot aggregation, one or more frequency resources associated with RMSI repetition or RMSI slot aggregation, one or more keying modes associated with RMSI repetition or RMSI slot aggregation, or a combination thereof.

In a thirty-second aspect, alone or in combination with the thirty-first aspect, the apparatus transmits, to the one or more UEs, a PBCH that includes a configuration message associated with a particular CORESET. The configuration message includes one or more fields that indicate a mapping between a value of one or more fields of the DCI and resources, parameters, or both resources and parameters associated with RMSI repetition or RMSI slot aggregation.

In a thirty-third aspect, alone or in combination with the thirty-first aspect, the apparatus transmits, to the one or more UEs, a PBCH including one or more reserved bits that indicate that the configuration of resources is associated with RMSI repetition or RMSI slot aggregation.

In a thirty-fourth aspect, alone or in combination with the thirty-first aspect, the apparatus transmits to the one or more UEs, a PBCH that includes a configuration message associated with a particular CORESET. The configuration message includes one or more fields that are interpretable based on predetermined configuration information stored at the one or more UEs.

In a thirty-fifth aspect, in combination with the thirty-fourth aspect, the predetermined configuration information includes a table, a first column of the table indicates a first interpretation of the one or more fields that is to be used by a first type of UEs, and a second column of the table indicates a second interpretation of the one or more fields that is to be used by a second type of UEs that are configured to support RMSI repetition or RMSI slot aggregation.

In a thirty-sixth aspect, in combination with the thirty-fourth aspect, the predetermined configuration information indicates a mapping between a value of one or more fields of the DCI and resources, parameters, or both resources and parameters corresponding to RMSI repetition or RMSI slot aggregation.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and the modules described herein with respect to FIGS. 1-8 include processors, electronics devices, hardware devices, electronics components, logical circuits, memories, software codes, firmware codes, among other examples, or any combination thereof. In addition, features discussed herein may be implemented via specialized processor circuitry, via executable instructions, or combinations thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. In some implementations, a processor may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, that is one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to some other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, some other implementations are within the scope of the following claims. In some cases, the actions recited in the claims can be performed in a different order and still achieve desirable results.

As used herein, including in the claims, the term "or," when used in a list of two or more items, means that any one of the listed items can be employed by itself, or any combination of two or more of the listed items can be employed. For example, if a composition is described as containing components A, B, or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (that is A and B and C) or any of these in any combination thereof. The term "substantially" is defined as largely but not necessarily wholly what is specified (and includes what is specified; for example, substantially 90 degrees includes 90 degrees and substantially parallel includes parallel), as understood by a person of ordinary skill in the art. In any disclosed implementations, the term "substantially" may be substituted with "within [a percentage] of" what is specified, where the percentage includes 0.1, 1, 5, or 10 percent.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A user equipment (UE) comprising:
a processing system that includes at least one processor; and
a memory system that includes at least one memory, the memory system being coupled with the processing system and storing processor-readable code that, when executed by the processing system, causes the UE to:
receive, from a network entity, a subset of remaining minimum system information (RMSI) message portions of a set of RMSI message portions that collectively form an entire RMSI message, each RMSI message portion of the set of RMSI message portions being received in a different respective slot; and
transmit, to the network entity, a random access channel (RACH) preamble to initiate access to a network associated with the network entity in accordance with a partial RMSI message comprised of an aggregation of the RMSI message portions of only the received subset of RMSI message portions.

2. The UE as recited in claim 1, wherein the set of RMSI message portions is transmitted by the network entity in the different respective slots within a single frame, the frame including additional slots that do not include any RMSI message portions and that are interspersed between the slots in which the set of RMSI message portions are transmitted.

3. The UE as recited in claim 1, wherein the partial RMSI message is formed from the subset of RMSI message portions according to downlink control information (DCI).

4. The UE as recited in claim 3, wherein the DCI indicates a configuration of resources, parameters, or resources and parameters for transmission of the set of RMSI message portions.

5. The UE as recited in claim 4, wherein resources, parameters, or resources and parameters of the configuration indicated by the DCI include at least one of time resources, frequency resources, or keying modes.

6. The UE as recited in claim 4, wherein the UE monitors an RMSI physical downlink control channel (PDSCH) for the set of RMSI message portions according to the configuration indicated by the DCI.

7. The UE as recited in claim 1, wherein the partial RMSI message is formed from the subset of RMSI message portions according to a configuration message that is received by the UE and that provides a mapping to a configuration of resources, parameters, or resources and parameters associated with transmission of the set of RMSI message portions.

8. The UE as recited in claim 7, wherein the memory system stores an RMSI configuration table that includes a plurality of cells, each of the cells corresponds to a respective indicator value for a configuration of a plurality of configurations and a UE type of a plurality of different UE types, a type of the UE is one of the plurality of different UE types, and the mapping is according to an indicator value provided in a field of the configuration message and the UE type of the UE.

9. A network entity comprising:
a processing system that includes at least one processor; and
a memory system that includes at least one memory, the memory system being coupled with the processing system and storing processor-readable code that, when executed by the processing system, causes the base station to:
construct a set of remaining system information (RMSI) message portions that, when aggregated, form an entire RMSI message;
transmit, to one or more UEs, the set of RMSI message portions via different respective slots; and
receive, from a UE of the one or more UEs, a random access channel (RACH) preamble to initiate access to a network associated with the network entity, the RACH preamble being transmitted by the UE in accordance with a partial RMSI message associated with an aggregation of only a subset of RMSI message portions of the set of RMSI message portions.

10. The network entity as recited in claim 9, wherein the set of RMSI message portions is transmitted by the network entity in the different respective slots within a single frame, the frame including additional slots that do not include any RMSI message portions and that are interspersed between the slots in which the set of RMSI message portions are transmitted.

11. The network entity as recited in claim 9, wherein the processor-readable code when executed by the processing system, further causes the network entity to:
transmit, to the UE, downlink control information (DCI) that indicates a scheme according to which the RMSI message is divided into the set of RMSI message portions.

12. The network entity as recited in claim 11, wherein the DCI indicates a configuration of resources, parameters, or resources and parameters associated with transmission of the set of RMSI message portions.

13. The network entity as recited in claim 12, wherein resources, parameters, or resources and parameters of the configuration indicated by the DCI include at least one of time resources, frequency resources, or keying modes.

14. The network entity as recited in claim 12, wherein the transmission of the set of RMSI message portions is over a physical downlink control channel (PDSCH) monitored by the UE according to the configuration indicated by the DCI.

15. The network entity as recited in claim 14, wherein the DCI indicates the configuration by a mapping of an indicator value of the DCI, and wherein, the processor-readable code when executed by the processing system, further causes the network entity to:
transmit, to the UE over a physical broadcast channel (PBCH), the DCI including the indicator value.

16. The network entity as recited in claim 15, wherein the DCI is interpretable differently by different UEs of the one or more UEs that are of different UE types of a plurality of different UE types according to an RMSI configuration table stored in memories of the different UEs, and the RMSI configuration table includes a plurality of cells, each of the cells corresponds to an respective indicator value of a plurality of indicator values for a configuration of a plurality of configurations and a UE type of the different UE types, the indicator value of the DCI being interpretable by the mapping to the RMSI configuration table and a cell pertaining to the UE type of the UE.

17. A user equipment (UE) comprising:
a processing system that includes at least one processor; and
a memory system that includes at least one memory, the memory system being coupled with the processing system and storing (a) a remaining system information (RMSI) configuration table and (b) processor-readable code that, when executed by the processing system, causes the UE to:
monitor a channel for a plurality of RMSI transmissions of an RMSI message from a base station according to a configuration selected from the RMSI configuration table, wherein the plurality of RMSI transmissions are transmitted with at least one of RMSI message repetition or RMSI message division; and
access a network associated with the base station in accordance with at least a part of an RMSI message obtained from at least a subset of the plurality of RMSI transmissions.

18. The UE as recited in claim 17, wherein the configuration includes at least one of RMSI message resources or RMSI message parameters.

19. The UE as recited in claim 18, wherein the RMSI configuration table indicates the configuration of the at least one of RMSI message resources or RMSI message parameters.

20. The UE as recited in claim 18, wherein the RMSI configuration table indicates how to interpret downlink control information (DCI) that is received by the UE from the base station for the configuration, and wherein resources, parameters, or resources and parameters of the configuration indicated by the DCI include at least one of time resources, frequency resources, and keying modes.

21. The UE as recited in claim 17, wherein different columns or different rows of the RMSI configuration table correspond to a plurality of different UE types dividing configurations of a plurality of configurations included in the RMSI configuration table into different respective sets of configurations for respective ones of the plurality of different UE types, a UE type of the UE is one of the plurality of different UE types, and the configuration is one of the configurations of the plurality of configurations corresponding to the UE type of the UE.

22. The UE as recited in claim 21, wherein cells formed by columns and rows of the RMSI configuration table include a configuration of a plurality of configurations corresponding to a mapping of a respective indicator value of downlink control information (DCI), the mapping indicating a configuration of at least one of RMSI message resources or RMSI message parameters of the RMSI transmissions.

23. The UE as recited in claim 21, wherein the RMSI configuration table includes:
a first set of cells for a first UE type of the plurality of different UE types, the first set of cells including configurations of a plurality of configurations mapped to indicator values of downlink control information (DCI) for the at least one of the RMSI message repetition or the RMSI message division; and
a second set of cells for a second UE type of the plurality of different UE types, the second set of cells including configurations of the plurality of configurations mapped to the indicator values of the DCI for the RMSI message being received in a manner that is not associated with the at least one of the RMSI message repetition and the RMSI message division.

24. A base station for managing connections with user equipment (UE) within a network, the base station comprising:
a processing system that includes at least one processor; and
a memory system that includes at least one memory, the memory system being coupled with the processing system and storing processor-readable code that, when executed by the processing system, causes the base station to:
transmit a plurality of remaining system information (RMSI) transmissions for an RMSI message to one or more UEs; and
establish network access for a UE of the one or more UEs in accordance with at least a part of an RMSI message obtained by the UE from at least a subset of the plurality of RMSI transmissions monitored according to an RMSI configuration table stored in a memory of the UE.

25. The base station as recited in claim 24, wherein transmission of the plurality of RMSI transmissions for the RMSI message to the one or more UEs is in accordance with a configuration of at least one of RMSI message resources or RMSI message parameters provided in the RMSI configuration table.

26. The base station as recited in claim 25, wherein the processor-readable code that, when executed by the processing system, further causes the base station to:
transmit, to the one or more UEs, downlink control information (DCI) indicating the configuration, wherein the DCI includes an indicator value that is interpretable differently by different UEs of the one or more UEs that are of different UE types of a plurality of UE types according to the RMSI configuration table, and wherein the RMSI configuration table includes a plurality of cells, each of the cells corresponds to an indicator value of a plurality of indicator values for a configuration of a plurality of configurations and a UE type of the different UE types, the indicator value of the DCI being interpretable by mapping to the RMSI configuration table and a cell pertaining to the UE type of the UE.

27. The base station as recited in claim 26, wherein the DCI indicates the configuration, and the RMSI message resources or the RMSI parameters of the configuration include at least one of time resources, frequency resources, and keying modes.

28. The base station as recited in claim 26, wherein cells of the RMSI configuration table include a respective configuration resources, parameters, or resources and parameters for a corresponding indicator value of the DCI.

29. The base station as recited in claim 26, wherein the RMSI configuration table includes:
a first set of cells for a first UE type of the plurality of UE types, the first set of cells including configurations of a plurality of configurations mapped to indicator values of the DCI for at least one of RMSI message repetition or RMSI message division; and
a second set of cells for a second UE type of the plurality of UE types, the second set of cells including configurations of the plurality of configurations mapped to the indicator values of the DCI for the RMSI message being transmitted by the base station in a manner that is not associated with the at least one of the RMSI message repetition and the RMSI message division.

30. The base station as recited in claim 26, wherein the DCI including the indicator value is transmitted to the one or more UEs over a physical broadcast channel (PBCH).

* * * * *